US012089034B2

(12) United States Patent
Baltatu et al.

(10) Patent No.: US 12,089,034 B2
(45) Date of Patent: Sep. 10, 2024

(54) PROTECTION OF PRIVACY IN WIRELESS TELECOMMUNICATION NETWORKS

(71) Applicant: TELECOM ITALIA S.p.A., Milan (IT)

(72) Inventors: Madalina Baltatu, Turin (IT); Luciana Costa, Turin (IT); Roberta D'Amico, Turin (IT); Jovan Golic, Turin (IT); Dario Lombardo, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 407 days.

(21) Appl. No.: 16/303,833

(22) PCT Filed: May 30, 2016

(86) PCT No.: PCT/EP2016/062150
§ 371 (c)(1),
(2) Date: Nov. 21, 2018

(87) PCT Pub. No.: WO2017/207017
PCT Pub. Date: Dec. 7, 2017

(65) Prior Publication Data
US 2020/0322794 A1     Oct. 8, 2020

(51) Int. Cl.
*H04W 12/02* (2009.01)
*H04L 9/08* (2006.01)
(Continued)

(52) U.S. Cl.
CPC ........... *H04W 12/02* (2013.01); *H04L 9/0891* (2013.01); *H04L 9/3247* (2013.01);
(Continued)

(58) Field of Classification Search
CPC ............. H04W 12/02; H04W 12/0401; H04W 12/04033; H04W 12/06; H04W 12/04;
(Continued)

(56) References Cited

U.S. PATENT DOCUMENTS 6,373,949 B1 * 4/2002 Aura ..................... H04W 12/02
                                                                380/247
7,809,361 B2 * 10/2010 Ekberg ................. H04W 12/02
                                                                455/410

(Continued)

OTHER PUBLICATIONS

International Search Report and Written Opinion Issued on Feb. 13, 2017 in PCT/EP2016/062150 filed on May 30, 2016.
(Continued)

*Primary Examiner* — Oleg Korsak
(74) *Attorney, Agent, or Firm* — Oblon, McClelland, Maier & Neustadt, L.L.P.

(57) ABSTRACT

A method of protecting the exchange of privacy-sensitive data in a wireless communication network, the method including generating and providing a public cryptographic key to a first entity, possessing the data to be sent to the network through a wireless connection; generating and providing a private secret cryptographic key to a second entity, being the intended recipient of the data, the private key being bound to the public key and being associated to privacy support context information to identify the network; having the network send to the first entity respective wireless network privacy support context information; having the first entity receive the information and encrypt the data using the public key and the received information to obtain protected, encrypted privacy-sensitive data; having the first entity send to the second entity through the network the encrypted data; and having the second entity decrypt the encrypted data exploiting the private key.

16 Claims, 8 Drawing Sheets

(51) Int. Cl.
  *H04L 9/32* (2006.01)
  *H04W 12/041* (2021.01)
  *H04W 12/0433* (2021.01)
  *H04W 12/06* (2021.01)

(52) U.S. Cl.
  CPC ..... *H04W 12/041* (2021.01); *H04W 12/0433* (2021.01); *H04W 12/06* (2013.01)

(58) Field of Classification Search
  CPC ............ H04W 12/0433; H04W 12/041; H04L 9/0891; H04L 9/3247; H04L 63/0442; H04L 2209/80; H04L 9/3073; H04L 9/0861; H04L 9/0825
  See application file for complete search history.

(56) References Cited

U.S. PATENT DOCUMENTS

| | | | | |
|---|---|---|---|---|
| 7,885,410 | B1* | 2/2011 | Meier | H04L 9/32 713/168 |
| 7,986,778 | B2* | 7/2011 | Harrison | H04L 9/3073 380/30 |
| 8,347,090 | B2* | 1/2013 | Holtmanns | H04L 63/0869 380/278 |
| 9,130,744 | B1* | 9/2015 | King | H04L 9/14 |
| 9,319,223 | B2* | 4/2016 | Nix | H04W 52/0277 |
| 9,419,951 | B1* | 8/2016 | Felsher | H04L 9/0841 |
| 9,674,163 | B1* | 6/2017 | Feudo | H04L 9/321 |
| 9,768,961 | B2* | 9/2017 | Holtmanns | H04W 12/02 |
| 9,813,233 | B2* | 11/2017 | Wicker | H04L 9/006 |
| 10,149,168 | B2* | 12/2018 | Deshpande | H04L 9/0866 |
| 10,873,464 | B2* | 12/2020 | Muhanna | H04W 12/041 |
| 2002/0087862 | A1* | 7/2002 | Jain | H04L 9/3247 713/176 |
| 2003/0021417 | A1* | 1/2003 | Vasic | H04L 9/3263 713/155 |
| 2003/0115452 | A1* | 6/2003 | Sandhu | H04L 63/0815 713/155 |
| 2004/0034771 | A1* | 2/2004 | Edgett | H04L 63/0846 713/153 |
| 2004/0131188 | A1* | 7/2004 | Wang | H04L 9/0891 380/270 |
| 2004/0179684 | A1* | 9/2004 | Appenzeller | H04L 9/3073 380/44 |
| 2005/0102509 | A1* | 5/2005 | Fascenda | G07F 7/1016 713/165 |
| 2005/0132199 | A1* | 6/2005 | Boroughs | H04L 63/126 713/176 |
| 2005/0278565 | A1* | 12/2005 | Frattura | H04L 63/0407 714/5.1 |
| 2006/0013389 | A1* | 1/2006 | Harrison | H04L 9/321 380/30 |
| 2006/0062220 | A1* | 3/2006 | Suga | H04W 84/18 370/392 |
| 2006/0212928 | A1* | 9/2006 | Maino | H04L 9/0841 726/4 |
| 2007/0293197 | A1* | 12/2007 | Ekberg | H04L 9/3234 455/414.1 |
| 2008/0065878 | A1* | 3/2008 | Hutson | H04L 9/3297 713/153 |
| 2008/0130898 | A1* | 6/2008 | Holtmanns | H04W 12/02 380/278 |
| 2008/0304457 | A1* | 12/2008 | Thubert | H04L 61/6059 370/338 |
| 2009/0198997 | A1* | 8/2009 | Yeap | H04L 63/0823 713/155 |
| 2009/0307497 | A1 | 12/2009 | Appenzeller et al. | |
| 2010/0037293 | A1* | 2/2010 | StJohns | H04L 63/20 726/2 |
| 2010/0192212 | A1* | 7/2010 | Raleigh | G06Q 20/102 726/7 |
| 2010/0250437 | A1* | 9/2010 | Goeller | H04M 15/00 705/50 |
| 2012/0036368 | A1* | 2/2012 | Spalka | H04L 9/0866 713/182 |
| 2012/0170745 | A1* | 7/2012 | Bai | H04L 9/0866 380/270 |
| 2012/0311329 | A1* | 12/2012 | Medina | H04L 63/0442 713/168 |
| 2013/0012168 | A1* | 1/2013 | Rajadurai | H04W 12/04 455/411 |
| 2013/0080779 | A1* | 3/2013 | Holtmanns | H04W 12/033 713/168 |
| 2013/0101117 | A1* | 4/2013 | Wicker | H04L 9/3263 380/255 |
| 2013/0170643 | A1* | 7/2013 | Xiao | H04L 63/08 380/270 |
| 2014/0310349 | A1* | 10/2014 | Rainisto | H04W 4/21 709/204 |
| 2014/0365777 | A1* | 12/2014 | Cha | G06F 21/53 713/171 |
| 2015/0143125 | A1* | 5/2015 | Nix | H04L 9/3249 713/171 |
| 2015/0229473 | A1* | 8/2015 | Klein | H04L 9/0822 713/171 |
| 2015/0244690 | A1* | 8/2015 | Mossbarger | H04L 9/3263 713/171 |
| 2016/0112376 | A1* | 4/2016 | Gomez | H04L 63/20 713/168 |
| 2016/0127128 | A1* | 5/2016 | Chen | H04L 9/0866 713/189 |
| 2017/0118636 | A1* | 4/2017 | Zoorob | H04W 12/04 |
| 2017/0171187 | A1* | 6/2017 | Yin | H04L 9/3242 |
| 2017/0264439 | A1* | 9/2017 | Muhanna | H04W 12/06 |
| 2017/0324716 | A1* | 11/2017 | Frincu | H04L 63/126 |
| 2018/0013568 | A1* | 1/2018 | Muhanna | H04L 9/0825 |
| 2018/0234413 | A1* | 8/2018 | Watanabe | G06F 21/575 |

OTHER PUBLICATIONS

Cheng, C. et al., "Combined Public-Key Schemes: The Case of ABE and ABS", in Proceedings of Provable Security, 6th International Conference ProveSec 2012, China, pp. 53-69, XP047014943.

Chinese Office Action issued May 7, 2021 in Chinese Application No. 201680087417.3 (with Computer Generated English Translation).

* cited by examiner

PROTECTION OF PRIVACY IN WIRELESS TELECOMMUNICATION NETWORKS

BACKGROUND

Technical Field

The solution disclosed in this document generally relates to telecommunication networks, and more particularly to wireless telecommunication networks.

More specifically, the solution disclosed in this document is concerned with the protection of privacy-sensitive pieces of information (or with the preservation of the privacy of users' sensitive information) which happen to be exchanged in wireless telecommunication networks (e.g., mobile networks and Wi-Fi networks) between end users and elements of the network or between the network elements themselves.

For the purposes of the solution here disclosed, by wireless telecommunication networks it is meant any wireless network, including any type of mobile network, for example second generation networks—2G—(e.g., GSM—Global System for Mobile communications), third generation networks—3G—(e.g., UMTS—Universal Mobile Telecommunications System), fourth generation networks—4G—(e.g., LTE/LTE-A—Long Term Evolution/LTE-Advanced), and fifth generation networks—5G—which are currently under definition, and any Wi-Fi network based on various IEEE standards/technologies.

Overview of the Related Art

Privacy is an important issue in nowadays wireless telecommunication networks (shortly, wireless networks), where privacy-sensitive data is exchanged over the air sometimes unencrypted (i.e., in clear text).

Presently, in wireless networks, based on either mobile network technologies or Wi-Fi technologies, privacy-sensitive pieces of information are exposed over the air in clear text in a number of situations. Examples of privacy-sensitive pieces of information that happen to be exposed are: user's or subscriber's identity, user device identifiers and capabilities, authentication information, location information, etc. From the subscriber's point of view, such pieces of information are critical and, therefore, they should be protected from unauthorized disclosure and treating/handling, preferably along the whole path from their source (sender) to their final destination (recipient).

The current practice in wireless telecommunications mandates the use of symmetric cryptography (symmetric encryption) schemes for guaranteeing confidentiality of data sent over the air. Such symmetric cryptographic schemes are based on the assumption that the user has been previously identified by the wireless network. For example, a common algorithm used in today's mobile networks (like 3G and 4G networks) implements the AKA (Authentication Key Agreement) method, as defined in the Technical Specification 3GPP TS 33.401 of the 3rd Generation Partnership Project (3GPP), by the Technical Specification Group Services and System Aspects; 3GPP System Architecture Evolution (SAE); Security architecture (the standard document can be consulted at http://www.3gpp.ort/33401.htm). In the AKA method, the user is required to provide his/her subscriber identifier (i.e., the IMSI—International Mobile Subscriber Identity) to the mobile network in order for the mobile network to be able to subsequently retrieve the user's credentials and perform the user authentication procedure. The subscriber identifier is sent to the mobile network in clear text, since no cryptographic material is yet available/shared between the user and the network before the conclusion of the AKA procedure.

Therefore, symmetric encryption schemes used in today's mobile networks do not permit to protect any privacy-sensitive data that is exchanged before the completion of the user authentication procedure. This vulnerability can compromise the users' privacy through both passive and active attacks.

For example, by means of an IMSI sniffer, an attacker can gather all IMSIs that are active in a certain geographic area. An IMSI sniffer can achieve this in two different manners: passive and active. A passive sniffer will be simply observing unencrypted wireless traffic and storing all observed IMSIs. An active sniffer will be using a fake base station (fake BTS—Base Transceiver Station), to which mobile phones in the neighbourhood thereof will attempt to connect due to the detection of a stronger radio signal: and the fake base station will request (with an Identity Request message) each user to identify itself. The active IMSI sniffing is also known as IMSI catching in the mobile networks environment, and it is considered a feasible attack and, in recent years, even affordable by using out-of-the-shelves tools, as explained in detail in "Practical attacks against privacy and availability in 4G/LTE mobile communication systems", Altaf Shaik, Ravishankar Borgaonkar, N. Asokan, Valtteri Niemi, Jean-Pierre Seifert (available at http://arxiv.org/pdf/1510.07563.pdf) and in https://www.sba-research.org/wp-content/uploads/publications/DabrowskiEtAl-IMSI-Catcher-Catcher-ACSAC2014.pdf.

IMSI sniffing/catching attacks mostly relate to the issue of users' location privacy, as the transmission of IMSI reveals the user approximate location. Location privacy attacks attempt to link an identity to a location. User's location tracking is performed by sniffing the user identities sent in clear text over the air. An attacker can collect users' identities in an area or place (e.g., in an airport) and can further on track the users' presence and movements, as explained in details in https://www.sba-research.org/wp-content/uploads/publications/DabrowskiEtAl-IMSI-Catcher-Catcher-ACSAC2014.pdf.

Some mechanisms for defeating IMSI sniffing/catching were proposed in literature. In "IMSI-catch me if you can: IMSI-catcher-catchers", Adrian Dabrowski, Nicola Pianta, Thomas Klepp, Martin Mulazzani, and Edgar Weippl, in Proceedings of the 30$^{th}$ Annual Computer Security Applications 1 Conference, pages 246-255. ACM, 2014 (available at https://www.sba-research.org/wp-content/uploads/publications/DabrowskiEtAl-IMSI-Catcher-Catcher-ACSAC2014.pdf) several indicators for the possible presence of IMSI catchers have been presented. They are based on a network of stationary measurement devices and an Android app, each capable of detecting IMSI catchers. R Labs. Snoopsnitch website, at https://opensource.srlabs.de/projects/snoopsnitch also proposes the use of an Android app capable of detecting IMSI catchers. The app collects and analyzes mobile radio data to make a user aware of the mobile network security and to warn the user about threats like fake base stations (IMSI catchers), user tracking and over-the-air updates. These mechanisms are based on heuristics and are useful to warn the users about a potential presence of a fake BTS, but they do not actually prevent IMSI sniffing.

Coming back to the legacy authentication method of current networks based on AKA, since no common secrets are shared between end devices and the mobile network before user identification and AKA procedure completion, such a symmetric cryptographic scheme cannot offer adequate protection to sensitive data exchange during user identification and prior to AKA. However, an asymmetric (or public key-based) cryptography solution could offer adequate protection to sensitive user identification information during this phase. Solutions of this type were discussed during the 4G standardization process, for example Section 5.1 of "Rationale and track of security decisions in Long Term Evolved (LTE) RAN/3GPP System Architecture Evolution (SAE)", 3GPP TR 33.821, available at http://www.3gpp.org/DynaReport/33821.htm, (already in Rel-99 standardization of 3G). Nevertheless, the 3GPP decided against the usage of public key mechanisms because the implementation/management costs were deemed too high. However, recent findings (such as the already cited work "Practical attacks against privacy and availability in 4G/LTE mobile communication systems", Altaf Shaik, Ravishankar Borgaonkar, N. Asokan, Valtteri Niemi, Jean-Pierre Seifert, available at http://arxiv.org/pdf/1510.07563.pdf), demonstrated the vulnerabilities of 4G/LTE systems.

Several research presentations have shown how it is possible to exploit some signalling vulnerabilities to realize different types of attacks like fine grained location of subscribers and Denial of Service (DoS).

In the "SS7: Locate, Track & Manipulate", a video made available on youtube in December 2014 at https://www.youtube.com/watch?v=1Q0I5t10YLY, the authors show how to exploit the flaws of SS7 signalling protocol to gain access to SS7 networks and perform attacks against mobile subscribers.

Another work illustrates how to intercept and manipulate cellular conversations using such access ("Mobile_Self_Defense", Karsten_Nohl-31C3-vl.pdf, retrievable at https://events.ccc.de/congress/2014/Fahrplan/system/attachments/2493/original/Mobile_Self_Defense-Karsten_Nohl-31C3-vl.pdf), while P1 Security, 2014 http://labs.plsec.com/2014/12/05/ss7map-mapping-vulnerability-of-the-international-mobile-roaming-infrastructure-at-31c3/, presents a SS7 global security map. By exploiting the availability of a signalling interconnection it is in fact possible to retrieve user sensitive data, since signalling in mobile networks was designed without native authentication, based upon the assumption that telecom network operators trusted each other. The lack of a built in authentication method in signalling messages allows an attacker to send an spoofed SS7 MAP (Mobile Access Protocol) message called Send-AuthenticationInfo (SAI) to the user's home network to retrieve the data used to perform the user authentication. In this way the attacker has the information needed to successfully impersonate the legitimate network.

Unfortunately, the SendAuthenticationInfo message is legitimately used in roaming scenarios and cannot be filtered out at the borders. The use of the SendAuthenticationInfo message is only an example, as also reported in "The Fall of SS7 How Can the Critical Security Controls Help" (https://www.sans.org/reading-room/whitepapers/critical/fall-ss7--critical-security-controls-help-36225), where the authors describe how other messages can be illegitimately sent, like Hostile MAP Updates Location Requests, leading to DoS against legitimate subscribers. Update Location Request messages are sent by a roaming network entity towards the user's home network in order to update the location information stored (in the Home Subscriber System—HSS) regarding a particular subscriber. This typically happens in case of a handover, i.e., a subscriber moving from its home network to another network. The user's identity (IMSI) of the targeted subscriber is a mandatory field in a Location Update Request. Sending hostile location update messages can be used to cause DoS against one particular subscriber, by requesting relocation of this user (IMSI) to a non-existent network entity within the home network HSS. The user is then seen as unavailable and he/she becomes unreachable on the network. This means that the user can receive neither calls nor messages. A mechanism is therefore necessary to ensure the authenticity of the request's originator as well as the confidentiality of the returned sensitive information.

New signalling protocols such as the DIAMETER protocol used in 4G network can be abused for the same purposes.

In "Defeating IMSI Catchers", Fabian van den Broek, Roel Verdult, Joeri de Ruiter (available at http://www.cs.ru.nl/~rverdult/Defeating_IMSI_Catchers-CCS_2015.pdf) a mechanism is proposed which partially defeats IMSI catching attacks and increases the credibility of the mutual authentication with the home network. The proposed mechanism replaces the user identity (IMSI) with changing pseudonyms that are only identifiable by the user home network. Consequently, these pseudonyms are un-linkable by intermediate network providers and malicious adversaries, and therefore mitigate both passive and active attacks. The pseudonyms are provided in a confidential manner with un-linkability between consecutive pseudonyms.

US 2012/0170745 A1 proposes a method and device for encrypting a subscriber identity during a paging procedure, which are particularly adapted to the paging performed by an MME using an IMSI. The method includes: A, using a key generated by the subscriber identity of the called UE to encrypt data Y which is obtained on the basis of the subscriber identity, then performing paging using a cipher text; and B, after the called UE receives the paging, determining by the called UE whether the cipher text is included, and if the cipher text is included, regarding itself as the called UE. In the first preferred embodiment, the data Y is the subscriber identity; in the second preferred embodiment, the data Y is the data combined by the subscriber identity and the random data X, and the random data X is sent along with the cipher text during the paging; in the third preferred embodiment, the data Y is the data combined by the subscriber identity and the random data Z, and the data Y contains the subscriber identity at a specific location, when receiving the paging, the UE performs decryption using the subscriber identity and determines whether the decrypted plaintext contains the subscriber identity at a location the same as the specific location to determine whether the paging is for itself.

Summary of the Disclosed Solution

The Applicant has observed that despite the efforts already done, the privacy of the users is still at risk in current wireless networks.

In particular, concerning the work of Fabian van den Broek et al, the Applicant has observed that the approach proposed therein does not completely remove IMSI capturing, since the new pseudonym is received only when the user is successfully authenticated and will be used only in the subsequent identity request messages. The advantage of the solution proposed in that work is that it does not require protocol changes in the messages currently defined for 3GPP mobile telephony, since the solution is designed to fit within the current standards. But this advantage comes at the cost of leaving the IMSI unprotected in, for example, Attach Request messages. As a consequence, a sniffer may still obtain the IMSI if it captures Attach Requests.

Concerning US 2012/0170745 A1, the IMSIs are encrypted in paging request messages so that only the destination UE (user's mobile device) can decrypt it. The encryption key is the IMSI itself. Three embodiments are described. In the first embodiment the IMSI is encrypted using the same IMSI as a key. In the second embodiment the IMSI and a random data are encrypted using the IMSI as a key. In the third embodiment the IMSI, a random data and the UE location are encrypted using the IMSI as a key. The Applicant has observed that the solution proposed therein is specific to LTE and does not cover all other cases (e.g., 5G mobile networks, Wi-Fi networks). Moreover, that solution is meant to protect only IMSIs inside paging request messages, and not in all the other cases where IMSI is sent in plain text by the UE. Therefore, the solution of US 2012/0170745 A1 cannot completely prevent IMSI capturing attacks, it cannot protect IMSIs and any other sensitive information sent by the user before an AKA procedure is completed, and does not offer means to protect (encrypt and authenticate) sensitive data exchanged between different network elements, for example in a roaming scenario.

The Applicant has observed that the increased computational power of present and future mobile devices, can support (already now or in the near future) the use of the asymmetric (public key-based) cryptography which up to now have been rejected by the 3GPP standardization group, where private keys are deployed on network elements/entities for signature and decryption, while all end users are entitled to perform public key encryption operations in order to protect any sensitive information they send to the authorized network elements.

The Applicant has tackled the problem of eliminating or at least reducing the risks of exposing user privacy-sensitive data in wireless networks.

In particular, the Applicant has realised that a scheme to provide confidentiality and authentication of signalling messages in wireless networks is therefore needed.

According to an aspect thereof, the solution disclosed in this document proposes a method of protecting the exchange of privacy-sensitive data in a wireless communication network. The method comprises:

generating and providing a public cryptographic key to a first entity, possessing privacy-sensitive data to be sent to a wireless communication network through a wireless connection;

generating and providing a private secret cryptographic key to a second entity, being the intended intermediate or final recipient of the privacy-sensitive data, the private secret cryptographic key being bound to the public cryptographic key and being associated to privacy support context information suitable to identify the wireless communication network;

having the wireless communication network send to the first entity respective wireless network privacy support context information;

having the first entity receive the wireless network privacy support context information sent by the wireless communication network and encrypt the privacy-sensitive data using the public cryptographic key and the received wireless network privacy support context information to obtain protected, encrypted privacy-sensitive data;

having the first entity send to the second entity through the wireless communication network the encrypted privacy-sensitive data;

having the second entity decrypt the encrypted privacy-sensitive data exploiting the private secret cryptographic key.

Said privacy support context information suitable to identify the wireless communication network may for example comprise one among: a wireless communication network identifier, particularly a Public Land Mobile Network Identifier, PLMN; a Service Set Identifier, SSID.

Said privacy support context information may for example comprise a combination of said wireless communication network identifier and a function indication adapted to identify a function of the second entity.

In embodiments of the solution disclosed herein, said privacy support context information comprises a combination of two or more identifiers of wireless communication networks.

In embodiments of the solution disclosed herein, said privacy support context information suitable to identify the wireless communication network comprises identifying information adapted to identify a currently active private secret cryptographic key of the wireless communication network.

Said privacy support context information may for example be broadcasted to the first entity by the wireless communication network, particularly exploiting at least one signaling message.

Particularly, said privacy support context information may for example be transmitted using one among: at least one Radio Resource Control message, particularly an RRC MIB message or an RRC SYSTEM INFORMATION message; at least one Beacon message.

In embodiments of the solution disclosed herein, said privacy support context information may be sent to the first entity contextually to, or as part of, a selection procedure of the wireless communication network, performed by the first entity, by a wireless network entity providing the wireless connection to the wireless communication network, particularly contextually to, or as part of, a Wi-Fi network discovery procedure or a mobile device synchronization procedure.

Said public cryptographic key may for example be provisioned to the first entity upon subscription of the first entity to the wireless communication network or subsequently over the air.

In embodiments of the solution disclosed herein the wireless communication network may comprise a first wireless communication network and a second wireless communication network, each comprising respective second entities which have been provided with first and second private secret cryptographic keys respectively bound to the public cryptographic key and associated to respective first and second privacy support context information.

The first entity may for example be connected to the first wireless network and may have to send privacy-sensitive data to one of the second entities of the second wireless network as final recipient.

In such a scenario the method may comprise:

having the first wireless communication network and the second wireless communication network communicate to each other the respective first and second privacy support context information;

at the first entity, receiving the first privacy support context information sent by the first wireless communication network and encrypting the privacy-sensitive data using the public cryptographic key and the first privacy support context information of the first wireless network to obtain first protected, encrypted privacy-sensitive data;

having the first entity send the encrypted privacy-sensitive data to one of the second entities of the first wireless network as intermediate recipient;

having the second entity of the first wireless network decrypt the encrypted privacy-sensitive data exploiting the first private secret cryptographic key to retrieve the privacy-sensitive data;

having the second entity of the first wireless network retrieve the second privacy support context information of the second wireless network by looking at the retrieved privacy-sensitive data;

having the second entity of the first wireless network encrypt the privacy-sensitive data exploiting the public cryptographic key and the second privacy support context information of the second wireless network to obtain second protected, encrypted privacy-sensitive data;

having the second entity of the first wireless network send the second protected, encrypted privacy-sensitive data to one of the second entities of the second wireless network as final recipient;

having the second entity of the second wireless network decrypt the received second protected, encrypted privacy-sensitive data exploiting the second private secret cryptographic keys.

Preferably, the method further comprises:

having the second entity of the first wireless network apply a digital signature to the second protected, encrypted privacy-sensitive data exploiting the first private secret cryptographic key and the first privacy support context information of the first wireless network before sending the second protected, encrypted privacy-sensitive data to the second entity of the second wireless network, and having the second entity of the second wireless network verify the digital signature applied by the second network entity of the first wireless network, by exploiting the public cryptographic key and the first privacy support context information of the first wireless network.

In particular, said privacy-sensitive data may comprise identifying information for authenticating the first entity in said wireless communication network.

In embodiments of the solution disclosed herein, the method may further comprise:

having the second entity of the second wireless network verify the identifying information of the first entity and computing authentication data for the authentication of the first network entity;

having the second entity of the second wireless network encrypt said authentication data for the authentication of the first entity using the public cryptographic key and the first privacy support context information of the first wireless network, to obtain protected, encrypted authentication data for the authentication of the first entity;

having the second entity of the second wireless network send the protected, encrypted authentication data to the second entity of the first wireless network;

having the second entity of the first wireless network decrypt the protected, encrypted authentication data using the first private secret cryptographic key to retrieve the authentication data, and having the second entity of the first wireless network authenticate the first network entity. Preferably, the method may further comprise:

having the second entity of the second wireless network apply a digital signature to the protected, encrypted authentication data using the second private secret cryptographic key and the second privacy support context information of the second wireless network before sending to the second entity of the first wireless network;

having the second entity of the first wireless network verify the digital signature applied by the second entity of the second wireless network, by using the public cryptographic key and the second privacy support context information of the second wireless network.

Said digital signature may for example be applied by using an attribute-based encryption and signature cryptosystem.

In embodiments of the solution disclosed herein, said generating and providing a private secret cryptographic key comprises generating and providing to said second entity at least two private secret cryptographic keys, and wherein the privacy support context information suitable to identify the wireless communication network comprises an indication of a currently used private secret cryptographic key among the at least two private secret cryptographic keys.

Preferably, the method may further comprise revoking one of the at least two private secret cryptographic keys.

According to another aspect thereof, the solution disclosed in this document proposes a system for protecting the exchange of privacy-sensitive data in a wireless communication network. The system comprises:

a wireless communication network providing wireless connectivity to first entities possessing privacy-sensitive data to be sent to the wireless communication network through a wireless connection;

an encryption function in the first entity for encrypting the privacy-sensitive data (SI) to be sent using a public cryptographic key and wireless network privacy support context information received from the wireless communication network, to obtain protected, encrypted privacy-sensitive data, wherein the wireless network privacy support context information are suitable to identify the wireless communication network;

a second entity in the wireless communication network being the intended intermediate or final recipient the privacy-sensitive data;

a decryption function in the second entity for decrypting the encrypted privacy-sensitive data received from the first entity using a private secret cryptographic key bound to the public cryptographic key and associated to the privacy support context information suitable to identify the wireless communication network.

The solution disclosed herein proposes the use of a dynamic, combined digital signature and encryption scheme to protect privacy-sensitive data from exposure and unauthorized handling which can lead to a denial of service attack against the user or to user tracking.

Advantageously, the proposed solution is quite light, since it does not require the deployment of a traditional and complete public key infrastructure (PKI), which was, in the past, considered too expensive for this context, not necessarily from the computational point of view, but mostly because it implicitly means the issue and management of public/private key pairs for billions of (mobile) users. The proposed solution, even if still based on a public key cryptography approach, reduces significantly the complexity and costs of key deployment and management, since most of the involved entities (e.g., basically all end users) are merely encrypting entities while only authorized network elements/ entities perform both digital signature and encryption operations. Moreover, the proposed solution does not heavily involve the end devices in key management procedures, while it provides for (possibly smooth) key revocation, such that all the entities always use the currently active public (and their corresponding private) keys and not some revoked, obsolete or even compromised key.

Advantageously, the proposed solution can require only one public key, which can be the same for all the communicating elements involved, and a number of private secret keys at least equal to the number of roaming wireless network partners. Each private secret key is bound to the public key through the use of a specific privacy support information identifying the wireless network entity entitled to use that private key. The private secret key is used by its owner (the wireless network entity authorized to use it) to sign potentially any signalling messages sent towards a roaming wireless network entity, so as to prove the authenticity of the request. Private secret keys are also able to decrypt any sensitive data encrypted with the (unique) public key and the specific privacy support information of the wireless network entity authorized to decrypt it. Public privacy support information is used to dynamically differentiate the authorized wireless networks entities (network elements/entities of wireless networks appertaining to different administrative domains or different operators in the mobile network terminology) each time authorized to perform decryption or signature verification.

Advantageously, the proposed solution can be applied at different points in a wireless network: at the wireless access network level, to protect privacy-sensitive data transmitted OTA in wireless networks, and at the wireless core network level, to protect privacy-sensitive data exchanged between networks entities belonging to wireless networks that have a roaming agreement between them.

When applied at the wireless access network level, the protection/encryption is performed at the source of the privacy-sensitive information (e.g., the end user device) and the decryption is enabled dynamically on the authorized wireless network elements/entities taking into account the user mobility. In this case the proposed solution ensures that privacy-sensitive data is not exposed OTA by avoiding its transmission in clear text.

When applied at the wireless core network level, the dynamic combined digital signature and encryption scheme is used when the wireless network receiving the privacy-sensitive data is not in charge of the user owning the privacy-sensitive data and needs to exchange the privacy-sensitive data with the user's home network; this situation is typical of a roaming scenario. In this case, the proposed solution ensures that privacy-sensitive data is exchanged in a protected way and handled only by authenticated and authorized wireless network entities.

The application of the protection scheme at these two levels ensures an end-to-end protection of privacy-sensitive information, thereby ensuring the protection of privacy-sensitive information in roaming scenarios as well, together with the authentication of all wireless network entities involved in the exchange of sensitive information.

The solution proposed herein provides inter alia IMSI encryption in all unicast messages, including Attach Request messages, which are sent when the AKA procedure is not completed yet. Therefore, the solution proposed herein prevents IMSI sniffing in most situations and may be combined with an improved use of IMSI pseudonyms, since 4G and 3G/2G networks already use temporary identities instead of IMSIs (e.g., TMSI—Temporary Mobile Subscriber Identity, GUTI-Globally Unique Temporary ID). Moreover, the proposed solution can also protect any kind of privacy-sensitive information, by providing confidentially and authentication to all messages containing information that, if revealed, can compromise the users' privacy.

BRIEF DESCRIPTION OF THE DRAWINGS

These and other features and advantages of the solution disclosed herein will be better understood by reading the following detailed description of exemplary embodiments thereof, provided merely by way of non-limitative examples. For its better intelligibility, the following description should be read making reference to the attached drawings, wherein.

DETAILED DESCRIPTION OF EXEMPLARY EMBODIMENTS OF THE DISCLOSED SOLUTION

Figure 1:
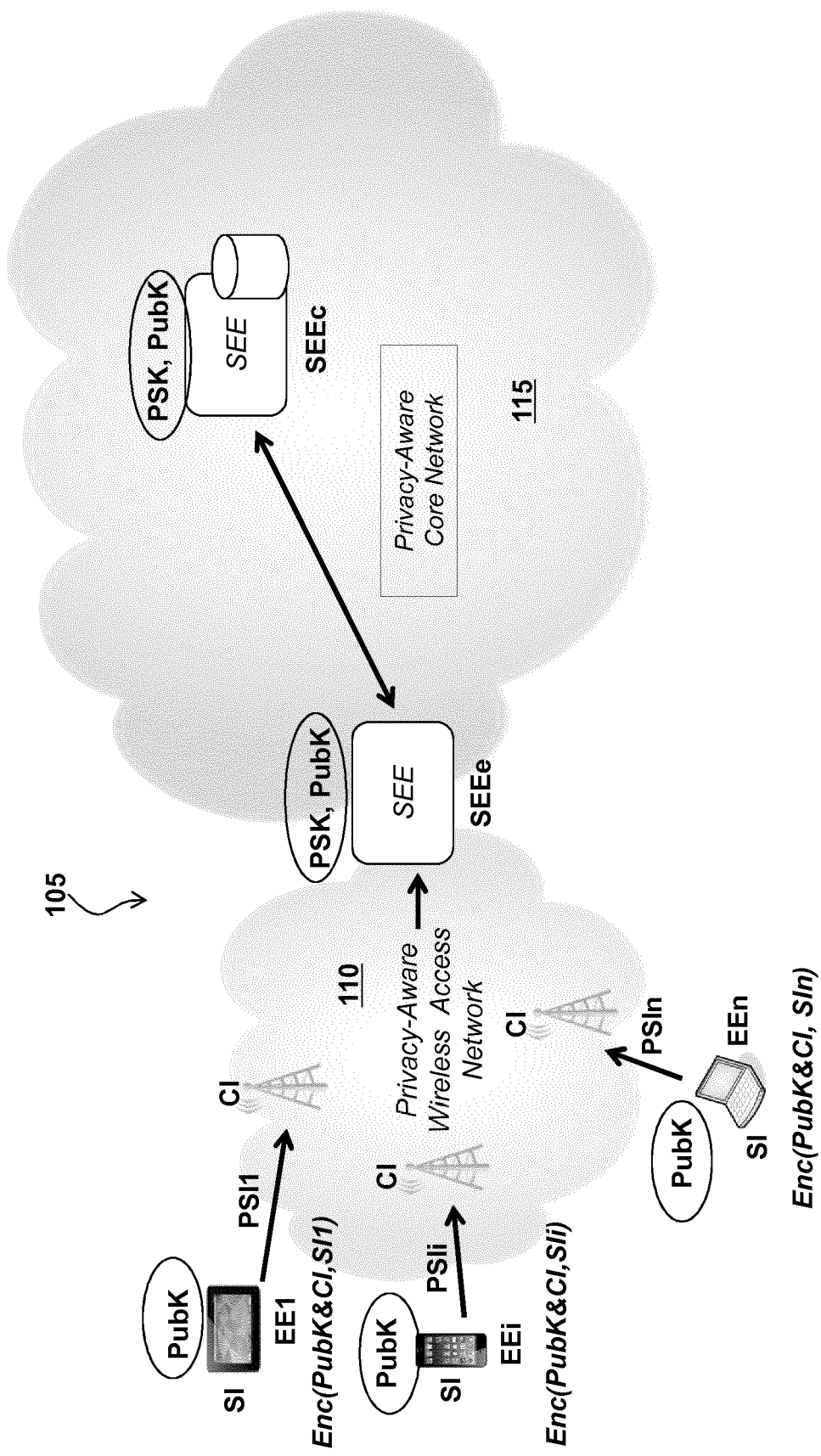
FIG. 1 is a logical-functional architecture of a scheme according to an embodiment of the solution disclosed herein, implemented in a mobile network.

FIG. 1 illustrates a high-level logical-functional architecture of a scheme according to an embodiment of the solution disclosed herein implemented in a wireless network, in the following also referred to as "privacy-aware wireless network". In the example shown in FIG. 1 the wireless network is a mobile network 105, and comprises a wireless access network ("privacy-aware wireless access network") 110 and a core network ("privacy-aware core network") 115.

According to the solution disclosed herein, the privacy-aware wireless network 105 comprises two basic logical-functional elements/entities: EE entities and SEE entities.

EE entities, like entities EE1, EEi and EEn shown in FIG. 1, are basically encrypting entities, which implement an encryption function for encrypting privacy-sensitive data (Sensitive Information) SI (SI1, SIi, Sin in FIG. 1) that they have to send Over The Air (OTA) to the privacy-aware wireless network 105. For performing the encryption, the EE entities are in possession of a public key PubK, generated and provisioned to the EE entities as described in detail later on, and "privacy support context information", shortly "context information" CI, which is for example broadcasted by the privacy-aware wireless network 105. EE entities may also have a digital signature verification function enabled. For example, according to the solution disclosed herein, end user devices in a mobile network (smartphones, tablets, personal computers equipped with Internet keys), also known as User Equipment (UE) in mobile network terminology, are EE entities.

SEE entities, like entities SEEe and SEEc shown in FIG. 1, are both digital signing and encrypting entities, but they also have a digital signature verification functionality enabled and can have a decryption functionality enabled. SEE entities are elements which are in possession of private secret keys PSK (generated and provisioned as described in detail later on) for digital signing and decryption (while EE entities only need to know the public key PubK and the correct context information CI required to successfully deliver OTA their privacy-sensitive data SI in a protected mode).

Depending on the particular wireless network architecture deployed, the functions of the SEE entities can be implemented on a network element located at the edge between the privacy-aware wireless access network 110 and the privacy-aware core network 115, like the SEE entity SEEe in FIG. 1, or directly on a core network element, like the SEE entity SEEc in FIG. 1, or the functions of the SEE entities can be implemented in a distributed manner on both the above types of network elements.

According to an advantageous embodiment of the solution disclosed herein, the public key PubK can be the same for all the network entities involved in the scheme according to the solution disclosed herein. In particular, as described in greater detail later on, the public key PubK can be the same for all the different privacy-aware wireless networks participating in the SI protection scheme according to the solution disclosed herein, such as wireless networks appertaining to different administrative domains or different network operators, in mobile network terminology.

Alternatively, different authorized privacy-aware wireless networks or network entities can be grouped in clusters where the public key PubK is the same within a cluster and different for different clusters. This may reduce the bitsize of the public key(s) PubK, which may be advantageous for some implementations.

Different context information CI for different privacy-aware wireless networks is instead required to differentiate/dynamically choose between the authorized privacy-aware wireless networks (and, consequently, the respective authorized network entities), as described in more detail later on. Context information CI may be data straightly related to the identity of the privacy-aware wireless network 105 and is for example generated at the cryptosystem initialization stage (as described later on). Suitable context information CI can for example be or include a wireless network identifier, e.g., for a mobile network, the Public Land Mobile Network IDentifier (the PLMN ID, which, as known, is the Mobile Country Code MCC plus the Mobile Network Code MNC), possibly concatenated with information identifying a private secret key in a multiplicity of stored private secret keys (e.g., an index that identifies the currently active private secret key PSK, currently used by the SEE entities of the mobile network), or the Service Set IDentifier (SSID) for a Wi-Fi network, concatenated with a private secret key identifying information or any other identification information construction. More generally, the context information CI may relate to a number of different authorized privacy-aware wireless networks or other entities (e.g., for lawful interception), in which case there is a set [CI] of individual context information CI. Moreover, inside the context information CI the various wireless network identifiers may also be logically combined (by using, for example, "and", "or" and "not"

logical operators) and may also contain various network roles/functions, like, for example: (PLMN ID and role: MME) for the individual context information of the Mobility Management Entity (MME) of a PLMN, or (PLMN ID and role:HSS) for the individual context information of the Home Subscriber Server (HSS) of a PLMN. This might meet the needs of some network configurations.

Once encrypted, the privacy-sensitive data SI is called "protected SI" (PSI). Reference numerals PSI1, PSIi and PSIn in FIG. 1 denote encrypted, protected privacy-sensitive data SI generated by the EE entities EE1, EEi and EEn, respectively, by encrypting their privacy-sensitive data SI SI1, SIi, SIn using the public key PubK and the context information CI broadcasted by the privacy-aware wireless network 105. In FIG. 1, the encryption operations of the respective privacy-sensitive data SI SI1, SIi, SIn which are performed by the EE entities EE1, EEi and EEn are denoted Enc(PubK&CI,SI1), Enc(PubK&CI,Sh), Enc(PubK&CI, SIn).

The EE entities EE1, EEi and EEn send the protected privacy-sensitive data SI PSI1, PSIi and PSIn OTA to the privacy-aware wireless network 105.

Encryption (and decryption) functions can be applied either to protect any specific piece of privacy-sensitive data SI, like privacy-sensitive user identifying data or generic privacy-sensitive data (for example, user/subscriber's identity, user device identifier, user device capabilities, network capabilities, user-related authentication information, user-related location information, etc.), or to protect an entire message used to convey the SI.

The encryption is performed by using the public key PubK and the context information CI provided by the serving privacy-aware wireless network, where by "serving privacy-aware wireless network" it is meant the wireless network that, at a certain moment, provides wireless connectivity to the EE entity (user device) together with the privacy-sensitive data protection service.

The serving privacy-aware wireless network can be the home wireless network of the considered user, i.e. the wireless network to which the user subscribed for the wireless communication services, e.g. mobile communication services, like in the example of FIG. 1.

Figure 2:
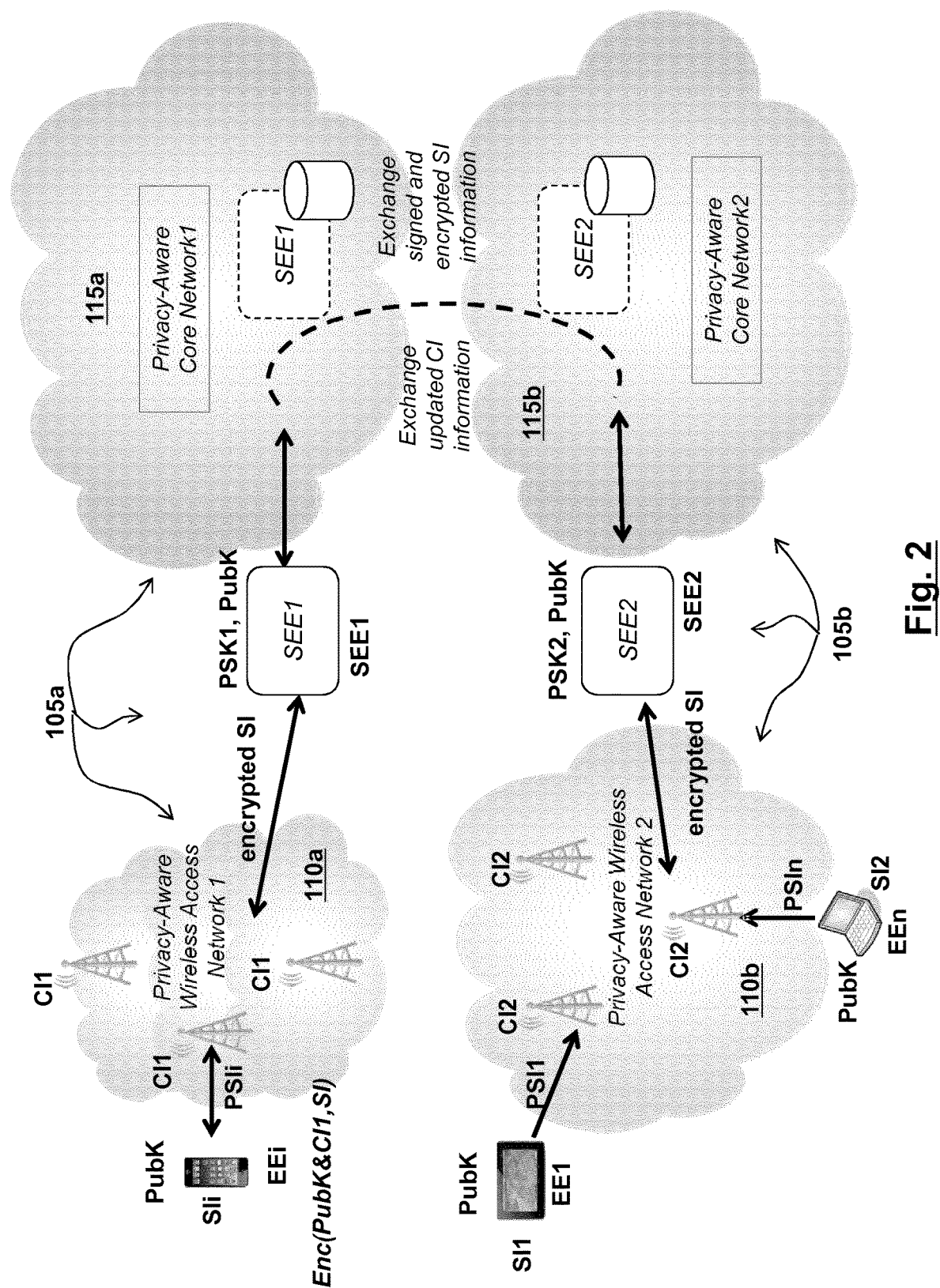
FIG. 2 depicts the implementation of the scheme according to an embodiment of the solution disclosed herein in a generic mobile network roaming scenario.
Figure 3:
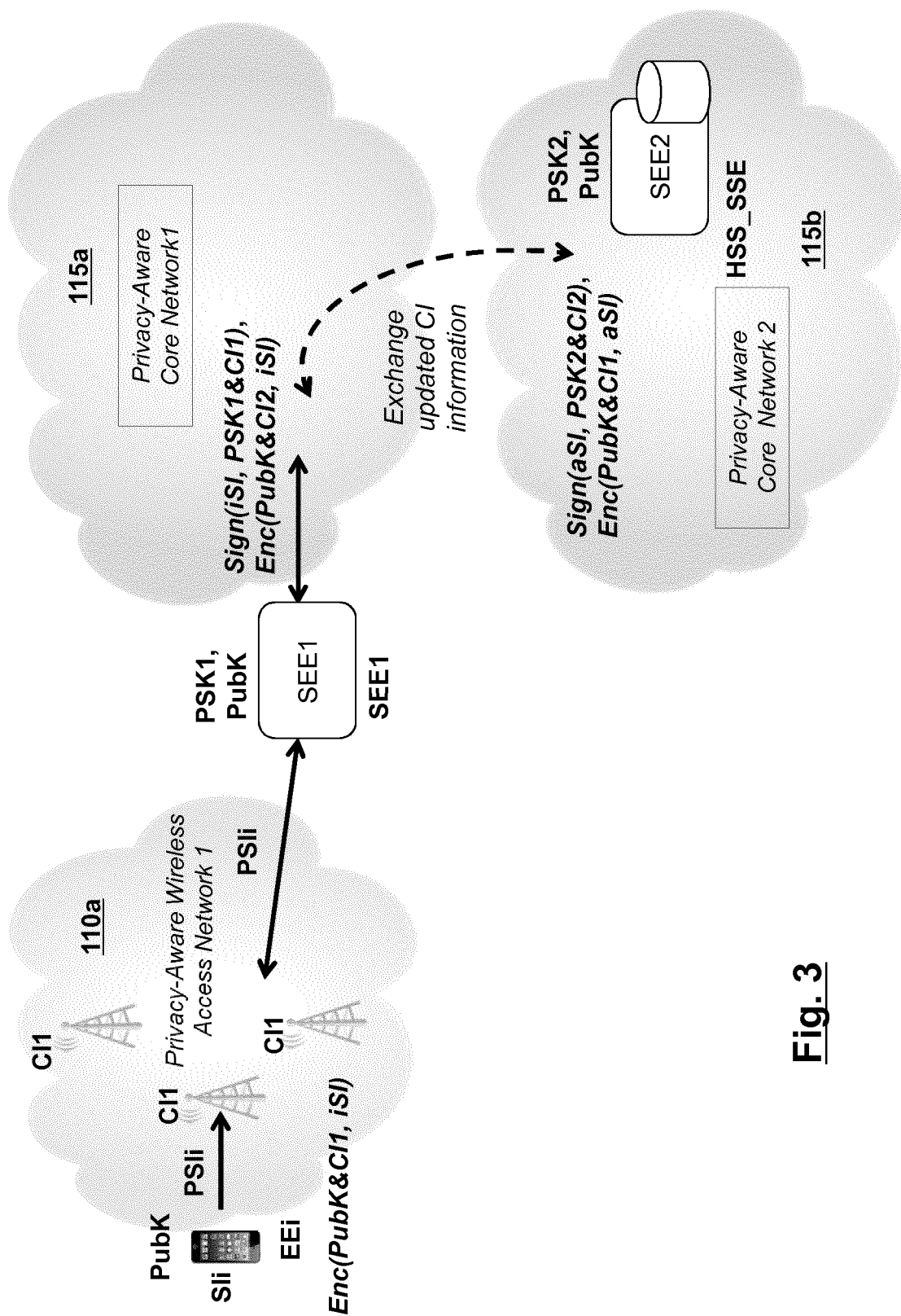
FIG. 3 depicts an exchange of data between the mobile networks in the roaming scenario of FIG. 2.

Due to the users' mobility, the serving privacy-aware wireless (mobile) network can also be a visited wireless (mobile) network, as in the examples depicted in FIGS. 2 and 3, where 105a and 105b denote two interconnected privacy-aware wireless (mobile) networks, e.g. two wireless (mobile) networks which have a roaming agreement and participate to the protection scheme according to the solution disclosed herein. The two privacy-aware wireless networks 105a and 105b have respective privacy-aware wireless access networks 110a and 110b and respective privacy-aware core networks 115a and 115b. SEE1 denotes an SEE entity of the SEE entities SEE1 of the privacy-aware wireless network 105a, SEE2 denotes an SEE entity of the SEE entities SEE2 of the privacy-aware wireless network 105b. CI1 and CI2 denote the context information of the privacy-aware wireless networks 105a and 105b, respectively, and PSK1 and PSK2 denote the private secret keys of the privacy-aware wireless networks 105a and 105b, respectively. EE entities EE1 and EEn are for example served by their home wireless network 105a, whereas EE entity EEi, being a subscriber of the privacy-aware wireless networks 105b, is at the considered moment served by the visited wireless network 105a, as depicted in FIG. 3.

Digital signature (and digital signature verification) functions can be applied to mutually authenticate the network entities involved in the processing/handling or simply transfer of privacy-sensitive data SI. For example, referring to FIG. 2, digital signature and digital signature verification functions are applied to mutually authenticate the SEE entities SEE1 and SEE2 of the two privacy-aware wireless networks 105*a* and 105*b* (like the SEE entities SEE1 and SEE2 in FIG. 2). The digital signature is performed by using the private secret key PSK1, PSK2 of the privacy-aware wireless network 105*a*, 105*b* and the context information CI1, CI2 associated thereto. In this way, the receiving network entity can be sure that the sending signing network entity is indeed authenticated (i.e., in possession of the private secret key PSK1/PSK2 corresponding to the declared context information CI1/CI2).

Based on the user mobility, the solution disclosed herein intrinsically and dynamically enables the decryption function only on the authorized network entities. Authorized network entities are those network entities which have been provisioned (as described later on) with the necessary decryption and signature private secret keys (like the private secret keys PSK1, PSK2) associated/bound with/to the corresponding context information (like the context information CI1, CI2). Therefore, only the authorized network entities are allowed to decrypt the information encrypted by the EE entities (where the EE entities may be a user device, e.g. a UE, or other network entity). Also the digital signature function is automatically enabled if the network entities that handle the SI are part of different administrative networks (e.g., in a roaming scenario), i.e., whenever the CI information changes along the path between the source of privacy-sensitive data SI and the final destination of the privacy-sensitive data SI.

In the example of FIG. 1, the authorized network entities are the SEE entities SEEe, SEEc of the home wireless network 105 to which a user device EE1, EEi, EEn is connected.

In the example of FIGS. 2 and 3, authorized network entities can be the SEE entities of the home wireless network of a user and the SEE entities of the serving visited wireless network to which a user, like the user represented by the EE entity EEi in FIG. 3, is connected after a mobility change, and the home wireless network of the user. In this case, the authorized network entities of the visited wireless network (the roaming partner of the home wireless network) may be requesting or sending privacy-sensitive data from or to the home wireless network of the user: such an exchange of privacy-sensitive data also requires authentication and therefore signatures.

Advantageously, the solution disclosed herein allows any EE entity (wireless device or UE in the mobile network terminology) to dynamically select the SEE entity which is authorized to perform decryption of the privacy-sensitive data SI owned by the EE entity, based on the context information CI received OTA from the serving wireless network.

In an embodiment thereof, the solution disclosed herein is based on a combined Attribute-Based Encryption and Signature cryptosystem (ABES). In such a cryptosystem, each communicating entity is assigned a set of attributes and the sensitive information is encrypted and/or signed with respect to a given access policy or structure regarding the attributes. In an Attribute-Based Encryption (ABE) cryptosystem, the sensitive information is encrypted in such a way that only the entities whose attributes satisfy a given access policy can decrypt. Similarly, in an Attribute-Based Signature (ABS) cryptosystem, the sensitive information is signed in such a way that only the entities whose attributes satisfy a given access policy can produce a valid signature.

The cryptosystem according to the solution disclosed herein implements an initialization procedure Init, a private secret key(s) generation procedure KeyGen, encryption and decryption procedures Encrypt and Decrypt, digital signature and digital signature verification procedures Sign and Verify, and a private secret key(s) revocation procedure Revoke. Such procedures are for example implemented as algorithms executed by data processing systems.

Let, for the moment, the initialization, private secret key generation and private secret key revocation procedures be left aside (a description thereof will be provided later on).

There exist two main types of ABE cryptosystems, namely, Ciphertext-Policy ABE (CP-ABE) cryptosystems and Key-Policy ABE (KP-ABE) cryptosystems. In the former, the total access policy is embedded in the encryption function and hence the ciphertext (and is also part of ciphertext), whereas the decrypting entity attributes are embedded into its private secret key (and are part of the private secret key). In the latter, the total set of attributes is embedded in the encryption function and hence the ciphertext (and is also part of ciphertext), whereas the decrypting entity access policy is embedded into its private secret key (and is part of the private secret key). The embodiment of the solution described in the sequel follows the CP-type notation, but, for the particular attributes considered, can equivalently be represented as the KP-type cryptosystem.

The encryption procedure Encrypt(PubK, SI, A) is performed on EE entities, and sometimes also on SEE entities. The encryption procedure Encrypt(PubK, SI, A) takes as input public parameters PP representing the public key PubK, the privacy-sensitive information SI to be protected and an access structure (also known as access policy) A defined over a universe U of all accepted privacy-support context information CI as attributes for a given PubK. In general, the universe U is a set of all relevant attributes and the access structure A is a set of subsets S of attributes from the universe U satisfying the access policy. The encryption procedure outputs a ciphertext CT equal to the protected privacy-sensitive information PSI such that a private secret key PSK generated from a subset S can be used to decrypt the ciphertext (protected privacy-sensitive information) PSI if and only if S∈A. The access structure A is implicitly included in the ciphertext. In the solution disclosed herein, where the universe U is the set of all accepted privacy-support context information CI, the access structure is defined as A={CI} for a given single privacy-support context information (attribute) CI and hence a single-element subset S of the universe U satisfies the access policy if and only if S=CI.

More generally, for a given set [CI] of different context information CI, the access structure A can be defined as a set of all subsets S of the universe U containing at least one element of the set [CI], i.e., having a nonzero intersection with the set [CI]. In this case, a single-element subset S satisfies the access policy if and only if S∈[CI]. Note that single-element subsets S determine private secret keys PSK for individual networks or network entities in the system.

Preferably, the encryption procedure should inherently be randomizing with respect to the privacy-sensitive data SI and the access structure A. This means that repeated executions of the encryption procedure for the same privacy-sensitive data SI and/or the same access structure A should give rise to random ciphertexts. This property allows ensuring unlinkability of repeated encryptions with the same public key PubK.

The decryption procedure Decrypt(PubK, PSI, PSK) is performed on SEE entities. The decryption procedure takes as input public parameters PubK, a ciphertext (the protected privacy-sensitive data PSI), which contains an access structure A, and a private secret key PSK associated with a subset of attributes S. It outputs the privacy-sensitive data SI in clear text if S∈A. If A={CI} for a given context information CI and if S is a single-element set, then the decryption procedure outputs the privacy-sensitive data SI if S=CI.

The digital signature procedure Sign(PubK, PSK, A, SI) is performed on SEE entities. The digital signature procedure takes as input the public key PubK, the privacy-sensitive data SI, an access structure A, and a private secret key PSK associated with a subset of attributes S. It outputs a valid digital signature σ if S∈A. The access structure A is implicitly included in the signature. In the solution disclosed herein, A={CI} and hence the digital signature is valid if S=CI, where CI is the privacy support context information.

The digital signature verification procedure Verify(PubK, σ, SI) is performed on SEE entities, but can be also performed by EE entities. The digital signature verification procedure takes as input the public key PubK, the (received) privacy-sensitive data SI, a signature σ with an access structure A and the public key PubK. The digital signature verification procedure outputs "True" if the digital signature is valid and "False" otherwise. The digital signature is verified as valid if S∈A (i.e., S=CI) and SI is authentic, i.e., the same as used in the digital signature procedure.

The procedures according to the solution disclosed herein can be implemented with a scheme such as, for example, CCP-ABES (Combined Ciphertext Policy—Attribute Base Encryption and Signature), presented in Cheng Chen, Jie Chen, HoonWei Lim, Zhenfeng Zhang, and Dengguo Feng: "Combined Public-Key Schemes: The Case of ABE and ABS", in Proceedings of Provable Security, 6th International Conference ProveSec 2012, China, in the sense that the basic ABES mathematics may be the same as described by the cited scheme. It should be noted that this scheme can deal with access structures corresponding to arbitrary linear secret sharing schemes. The privacy support context information CI used in the solution disclosed herein corresponds to the attributes in a way as described above. The tuple of algorithms (Init, KeyGen, Encrypt, Decrypt, Sign, Verify, Revoke) partially matches the tuple (Setup, KeyGen, Encrypt, Decrypt, Sign, Verify) from the ABES scheme. The initialization and revocation procedures require additional specific steps dependent on the deployment context.

Figure 4:
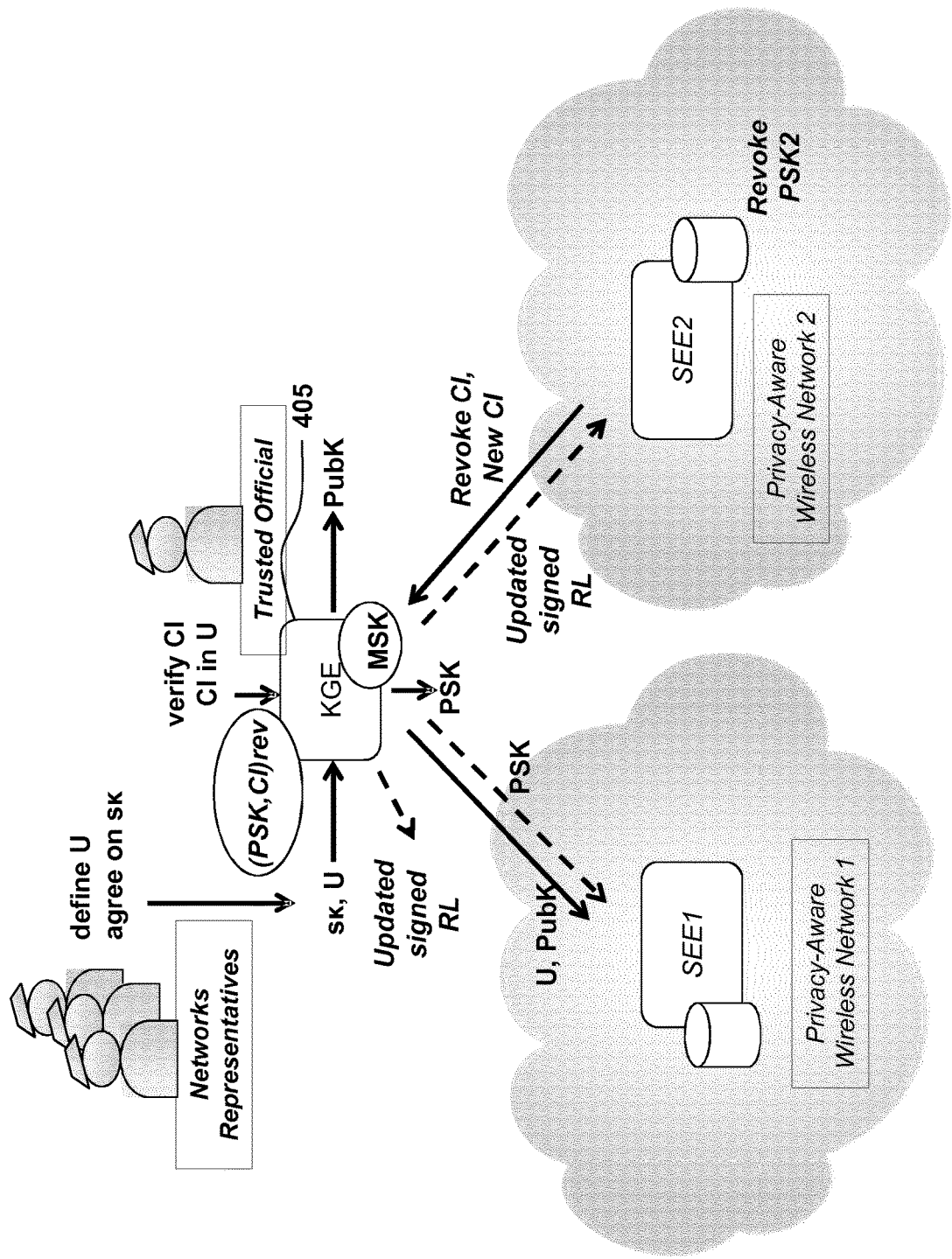
FIG. 4 illustrates an exemplary initialization and cryptographic material provisioning procedure according to an embodiment of the solution disclosed herein.

FIG. 4 illustrates a possible procedure of initialization and distribution (provisioning) of cryptographic material and public identification data, according to an embodiment of the solution disclosed herein.

The initialization stage is preferably performed on a trusted Key Generation Entity (KGE) 405, which performs the abovementioned initialization procedure Init. The initialization procedure Init(sk, U) takes as input a security parameter sk, which is intrinsical to the mathematical security analysis of ABE (Attribute-Based Encryption) schemes and as such defines the achievable security level, along with a universe U of accepted context information CI, i.e., the context information CI of all the privacy-aware wireless networks, i.e. their SEE entities involved in the protection scheme. The security parameter sk and the universe U of accepted context information CI are for example defined/agreed upon by representatives of the wireless network operators. In the initialization procedure, public parameters PP which collectively form the system public key PubK and a master secret key MSK (which is only known to the trusted KGE 405) are generated. The security parameter sk and the master secret key MSK are well-known parameters intrinsic to all ABE schemes and their role is defined, for example, in the same work "Combined Public-Key Schemes: The Case of ABE and ABS" cited above, or in "Attribute-Based Encryption for Fine-Grained Access Control of Encrypted Data" by V. Goyal, O. Pandey, A. Sahai, B. Waters, available at: https://eprint.iacr.org/2006/309.pdf. The security level of a practical implementation depends on a careful choice of the security parameter sk and on the absolute secrecy of the master secret key MSK.

It should be noted that in known implementations of ABES schemes the bitsize of the public key PubK is linear in the cardinality |U| of the universe U. Consequently, if the overall number of authorized network entities with different context information CI is very large, the disclosed scheme can possibly become less effective. In this case, in order to reduce the bitsize of the public key PubK, the network entities could be clustered in groups each associated with a different public key PubK. In particular, the cluster can be centered around network operators and their roaming partners.

The trusted KGE 405 also performs the private secret key generation procedure KeyGen. The private secret key generation procedure KeyGen(PubK, MSK, CI) takes as input public key PubK, the master secret key MSK, and a support context information CI (belonging to the universe U), and outputs the private secret key PSK associated with the context information CI. In general, the private secret key generation procedure KeyGen should preferably be randomizing with respect to the context information CI, that is, the private secret key PSK should be random if the private secret key generation procedure KeyGen is repeated for the same context information CI. More generally, if A corresponds to a set [CI] of different context information CI, then the private secret key generation procedure KeyGen can output a random private secret key PSK for each context information CI e [CI], for the same public key PubK. In this case, there is a multiplicity of different private secret keys PSK corresponding to different context information CI e [CI], and each such private secret key PSK can decrypt the same encrypted message produced by the encryption procedure.

The private secret keys PSK can be generated (i.e., the private secret keys generation process can be performed) at the initialization stage or subsequently, e.g. at any time a wireless network (and therefore its authorized SEE entities) becomes active in the system, i.e., becomes an authorized privacy-aware wireless network.

An authorized privacy-aware wireless network may require more than just one private secret key PSK, e.g., a predetermined number of private secret keys PSK (a private secret keys set), in order to guarantee the possibility of implementing a smooth private secret key revocation (without disruption of communication and/or privacy-sensitive data SI protection functionalities). All the private secret keys PSK are bound to the public key PubK and a private secret key PSK is implicitly selected/authorized by an encrypting entity and indicated by a signing entity by means of a specific context information CI, e.g., by using an index pointing to the right key.

Preferably, the private secret keys generated by the trusted KGE 405 are securely provisioned to the SEE entities of the different authorized privacy-aware wireless networks, for example using a secure Out Of Band (OOB) secure communication channel.

The context information CI of the different authorized privacy-aware wireless networks should be available to all connecting EE entities before any device attach procedure can start, and to all communicating SEE entities (e.g., SEE appertaining to a home wireless network and to a roaming partner wireless network).

Updated context information CI is continuously provided by all authorized privacy-aware wireless networks to the connecting devices (EE entities), as well as to the roaming partners wireless networks. To the connecting EE entities, the context information CI can be provided in broadcast in appropriate signaling messages, specific to the underling communication technology. Preferably, this procedure is performed by means of specific signaling messages sent in broadcast contextually to, or as part of, the network selection procedure (e.g., Wi-Fi discovery procedure, or device synchronization procedure in mobile network, etc.).

The context information CI is preferably sent by extending the use of one of the already defined signaling message types or by defining a new dedicated field inside the already defined message types (this may be necessary in case the context information CI does not fit in the size defined for the current signaling messages). Alternatively, the context information CI can be sent in a new type of broadcast or unicast signaling message as expected to be for future-generation mobile networks.

As an example, in the case of mobile networks, the context information CI can be transmitted using one of the RRC (Radio Resource Control) messages sent in broadcast, like the RRC MIB or the RRC SYSTEM INFORMATION message.

In the case of Wi-Fi networks instead, the context information CI can be transmitted by using, for example, the Beacon messages.

A private secret key identification information (current network Privacy Attribute PA) is preferably also provided inside the context information CI in order to allow for smooth key revocation procedures.

Figure 5:
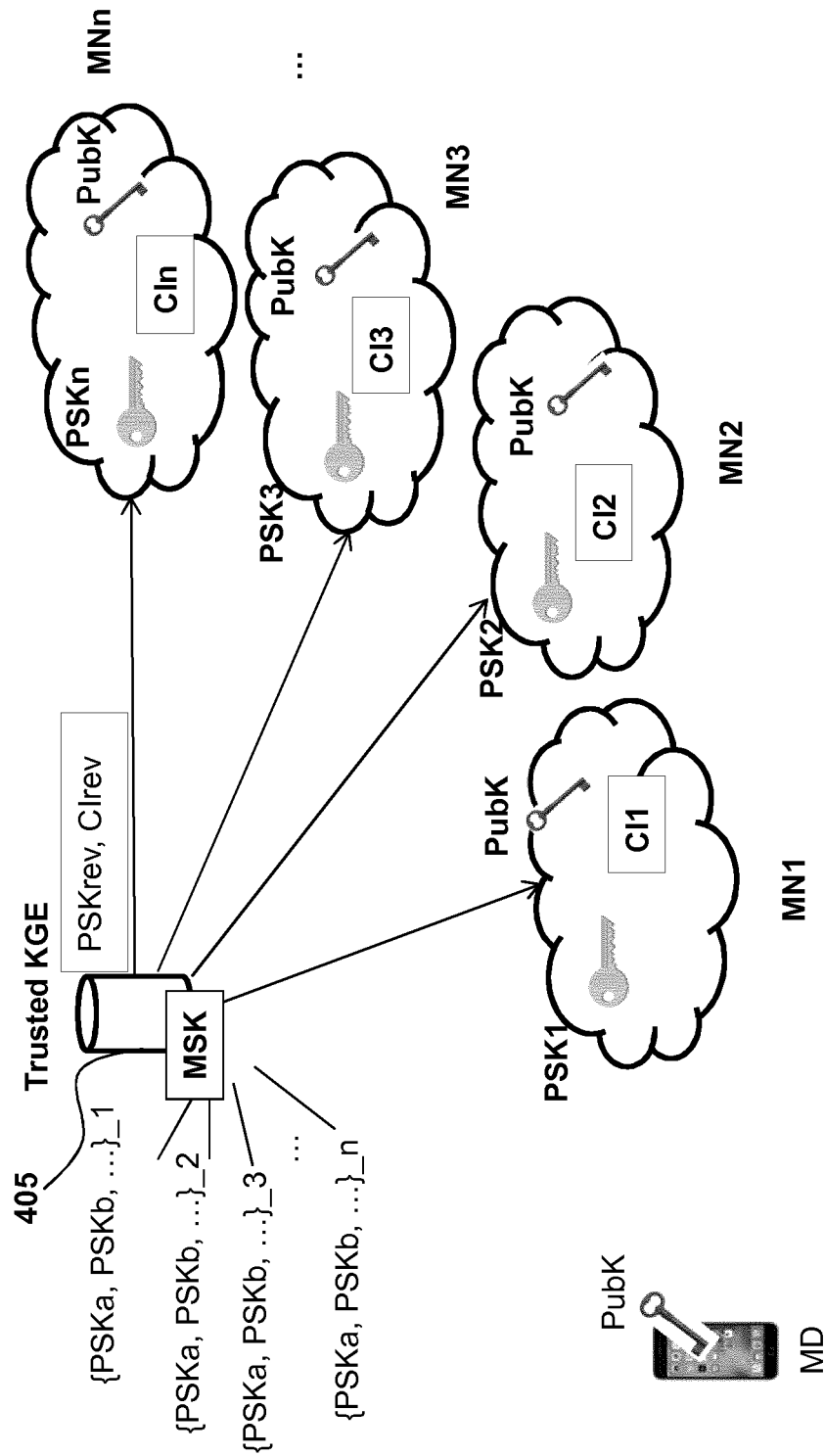
FIG. 5 depicts a cryptographic keys generation and management model for a scenario of multiple wireless mobile networks.

FIG. 5 depicts the process of generation and distribution of cryptographic material and public identification data in a scenario of a given number n of mobile networks MN1, MN2, MN3, . . . , MNn owned and managed by different mobile network operators having roaming agreements with each other, and willing to take part to the same privacy protection scheme according to the solution disclosed herein.

Each mobile network MNi, with $i \in [1,n]$, participating in the privacy protection scheme has to provide, to EE entities and to SEE entities of the other mobile networks, its own privacy support context information CIi ($i \in [1,n]$). As explained in the foregoing, the context information CIi of a mobile network MNi basically identifies the mobile network MNi and also provides an indexing scheme to identify the corresponding currently active private secret key PSKi ($i \in [1,n]$). All the context information CI1, CI2, CI3, . . . , CIn form the universe U of accepted context information: $U \equiv CI_1 \cup CI_2 \cup \ldots CI_n$.

All mobile networks MNi (e.g., the mobile networks operators' representatives) also agree on a security parameter sk.

The trusted KGE entity 405 takes the universe U of accepted context information and the security parameter sk in input and generates the master secret key MSK (which remains secret to the KGE entity 405) and the public key PubK of the system.

The trusted KGE entity 405 additionally generates the private secret keys required by each mobile network: preferably, each mobile network MNi is provisioned with a private secret keys set $PSK_i = \{PSK_i^a, PSK_i^b \ldots \}$, for allowing a smooth private secret key revocation. In the generic mobile network MNi ($i \in [1,n]$), the private secret key PSKi ($i \in [1,n]$) will be used (by the network's SEE entities) for decrypting privacy-sensitive data SI sent by its own users over the communication network and to sign privacy-sensitive data SI exchanged between the mobile networks participating at the scheme.

The public key PubK is available to any actor in the scheme (be it an EE entity or a SEE entity), while the private secret key PSKi of any mobile network MNi remains secret to the other mobile networks (and to the EE entities), and to any other unauthorized entity. The universe U of accepted context information is also available to all the partner mobile networks MN1, MN2, MN3, . . . , MNn and each mobile network MNi broadcasts its own current context information CIi to its served users.

Preferably, the generic mobile network MNi stores the respective private secret key PSKi (or sets of private secret keys) in the appropriate Mobility Management Entities (MME), the exact location of which depends on the specific network architecture. The private secret keys PSKi might also be stored in the authentication entities of the mobile networks MNi (basically the Home Subscriber Server—HSS in 4G networks) and eventually in the Diameter Edge Agent (DEA, generally the first entry point to the home mobile network in a roaming scenario).

The mobile networks users shall be provisioned with the public key PubK and the context information CI of the current serving mobile network MNi. As explained in the foregoing, the public key PubK (for example unique for the whole system of mobile networks) and the context information CIi of the currently serving mobile network MNi are the only inputs necessary to a user device MD to encrypt the user's privacy-sensitive data SI which is sent to the SEE entity of the currently serving mobile network MNi (for example, the MME of the currently serving mobile network).

The roaming partner mobile networks involved in any exchange of privacy-sensitive data SI related to a roaming user should be able to identify correctly their corresponding context information CI in order to be able to encrypt/decrypt and sign or verify the privacy-sensitive data SI or the protected privacy-sensitive data PSI they exchange. As mentioned in the foregoing, the privacy-sensitive data SI might be the roaming user's identifying information, the user's authentication data, the roaming user's location data, etc.

The provisioning of the public encryption key PubK to a mobile device MD can be performed by the home mobile network at subscription time or via secure OTA procedures.

The private secret key revocation procedure Revoke(CI, PSK), for revoking a private secret key (because it is close to its expiration time or because it has been compromised or leaked, etc.), or, is mainly performed by the trusted KGE 405 (or by a dedicated Trusted Third Party as agreed upon between the partner mobile networks operators). To this purpose the trusted KGE 405 has its own private secret key PSKrev and context information CIrev. The private secret key PSKrev is kept secret like the master secret key MSK (since its protection and secrecy are as high as those of the master secret key MSK). When a certain private secret key PSK is revoked for any reason, the corresponding context information CI is inserted in a revocation list signed by the trusted KGE 405 with the private secret key PSKrev and the trusted KGE context information CIrev. The revocation list is then made available to each partner wireless network, which will provide the revocation list to its users, preferably in special revocation messages broadcasted periodically over their network together with the context information CIrev of the trusted KGE 405, in order for the user devices to be able to verify the authenticity of the signature and therefore of the information contained therein. Prior to encrypting their privacy-sensitive data SI, the user devices should then control that the context information CI of the currently serving mobile network, broadcasted in normal CI messages, is not included in the revocation list. The period of the broadcasted revocation messages can be longer than the period of the normal CI broadcast messages.

Figure 6:
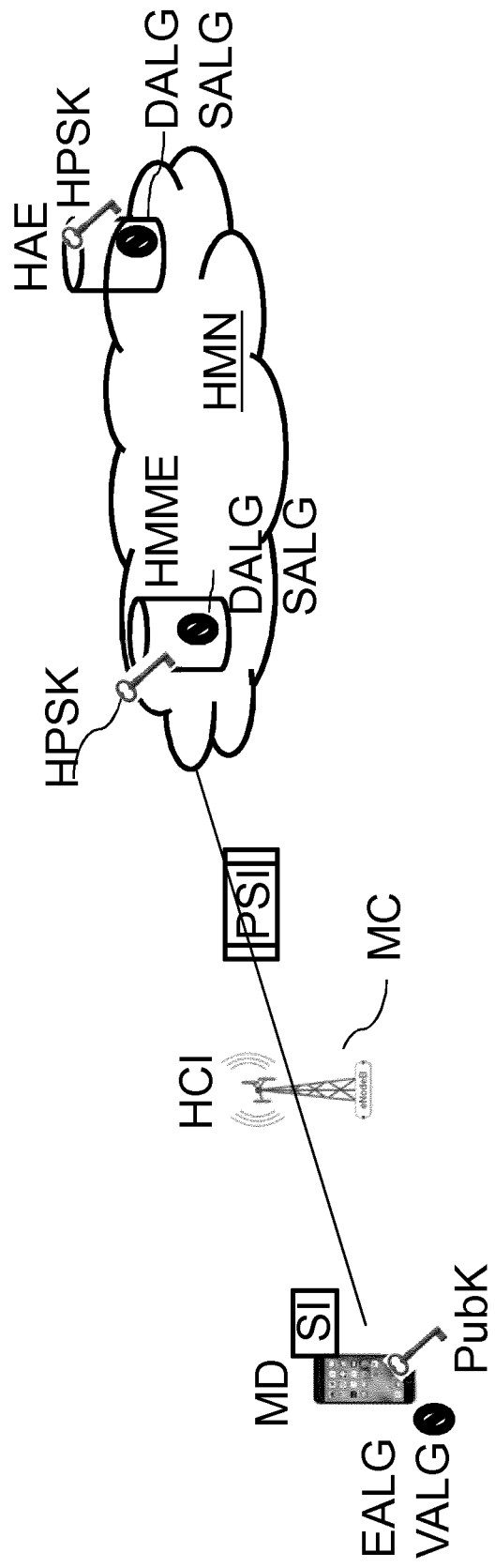
FIG. 6 shows an embodiment of the solution disclosed herein, for the protection of privacy-sensitive information in a user's home mobile network to which a user device is connected.

FIG. 6 shows an embodiment of the solution disclosed herein, for the protection of sensitive information in a home network to which a mobile user device (UE) is connected.

A mobile user device MD is connected to its home mobile network HMN via a mobile communication connection MC (like a 3G, 4G, 5G connection), but the mobile user device MD is not yet authenticated in the home mobile network HMN.

The home mobile network HMN has been assigned (e.g. in the initialization stage, as described in the foregoing) and is broadcasting the (home mobile network) context information HCI (i.e., the current network privacy attribute). The SEE entities (HMME, HAE, as discussed shortly hereafter) of the home mobile network HMN are provisioned with the current corresponding private secret key HPSK to be used for decryption and digital signing, since the SEE entities of the home mobile network HMN are authorized to decrypt privacy-sensitive data SI of the users which are subscribers of the home mobile network HMN and also to digitally sign SI records.

The mobile devices of all users subscriber of the home network HMN, like the mobile user device MD depicted in the figure, are provisioned (at subscription time or using some suitable OTA procedure) with the corresponding encryption public key PubK. This public key PubK and the current context information HCI of the home network HMN will be used by all home network user devices (all EE entities) to encrypt privacy-sensitive data SI by performing the encryption procedure Encrypt(PP, SI, A) (reference EALG in FIG. 6).

Therefore, the mobile device MD is connected to (but it is not yet authenticated in) its home network HMN and it has received, during the radio access procedure, the home network context information HCI used to perform encryption and therefore to protect the privacy-sensitive data SI. The mobile device MD is an EE entity and always uses the public key PubK together with the broadcasted home network context information HCI in order to encrypt the privacy-sensitive data SI, which, otherwise, would be sent in clear text on the mobile connection MC, since the legacy authentication procedure has not been performed/completed yet at this stage.

The authorized SEE entity of the home network HMN receives the protected (encrypted) sensitive information PSI and, by using the home network private secret key HPSK, the associated home network context information HCI, performs the decryption procedure Decrypt(PP, PSI, PSK) (reference DALG in FIG. 6), and retrieves the privacy-sensitive data SI in clear text. In this way the home network HMN is able to identify the user and to perform authentication (e.g., to complete the AKA procedure).

Decryption operations can be performed by any authorized SEE entity in the home network HMN, such as the home authentication entity HAE (e.g., the HSS in LTE networks) or by the entity in charge of mobility management HMME (e.g., the MME in LTE network): depending on the particular network architecture, one configuration may be preferred over the other. Reliance on the mobility management entity HMME is for example appropriate in cases where load balancing solutions are adopted in the home network HMN, which require the availability of the identifying privacy-sensitive data SI in clear text in order to be able to identify the entity in the home network HMN which is in charge with the authentication of a particular user. In this case it is therefore necessary to retrieve identifying sensitive data in clear text at the first entry point of the network, and such first entry point may be the home mobility management entity HMME. Therefore, the location and mobile network function of the SEE entity in charge of decryption of privacy-sensitive data depends on the home mobile network architecture and configuration.

While the location where the decryption operation is performed may vary from one mobile network architecture to another, the digital signature function (reference SALG in FIG. 6) is preferably always located on the SEE entity which requests or produces the privacy-sensitive data SI related to a user, since digitally signing requires the availability of the private secret key PSK. For example, for sending the user authentication data (e.g., the user's authentication vectors in LTE AKA), the issuing home authentication entity HAE (the HSS in LTE networks) can potentially sign and encrypt them before transmission to the home mobility management entity HMME. The encryption is performed with the public key PubK, while the digital signature employs the home private secret key HPSK. The home mobility management entity HMME can also digitally sign its request. This mechanism is superfluous if a secure channel already exists between the network elements involved in the exchange, since they belong to the same mobile network MN. Nevertheless, such a mechanism can be considered useful when the elements involved appertain to different mobile networks MN like in a roaming scenario (as described below).

Figure 7:
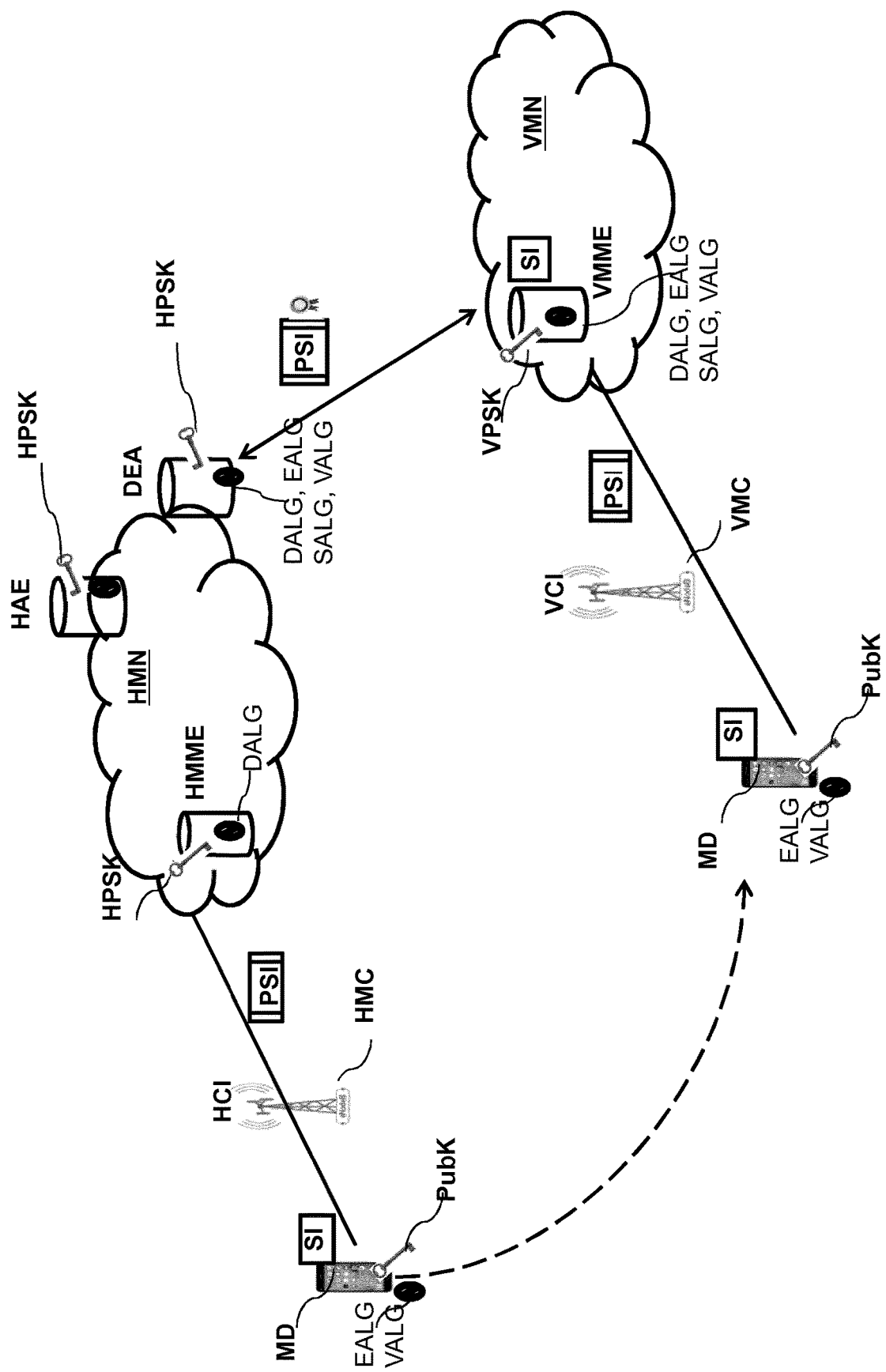
FIG. 7 shows another embodiment of the solution disclosed herein, for the protection of privacy-sensitive information in a serving visited mobile network, to which a user is connected in roaming after a mobility change, and in the user's home mobile network.

FIG. 7 shows another embodiment of the solution disclosed herein, for the protection of privacy-sensitive information in a visited serving mobile network, to which a user device (UE) is connected in roaming after a mobility change, and the home network. Thus, the embodiment of FIG. 7 represents a roaming scenario, where a mobile user device is connected to a serving mobile network which is different from its home mobile network.

When a mobile device MD changes location and moves, from the home mobile network HMN, to a new mobile network, herein referred as visited mobile network VMN, the mobile device MD should be able to dynamically authorize the visited mobile network VMN to perform decryption of protected privacy-sensitive data by using the visited network context information VCI broadcasted over the visited mobile connection VMC.

The mobile device MD receives the visited network context information VCI broadcasted over the visited mobile connection VMC and the mobile device MD uses the received visited mobile network context information VCI together with the public key PubK to perform the encryption (reference EALG in FIG. 7) of privacy-sensitive (identifying) data SI. Therefore, the mobile device MD is an EE entity in the visited mobile network VMN as it would be in its home mobile network HMN, and the context information changed dynamically and in a stealth manner from the previous home mobile network context information HCI to the correct one (visited mobile network context information VCI) in the given mobile context.

The visited mobile network VMN receives the protected (encrypted) privacy-sensitive data PSI from the mobile device MD. The visited mobile network SEE entity VMME in the visited mobile network VMN, that is preferably the network entity which, in the visited mobile network VMN, is in charge of mobility management, decrypts (reference DALG in FIG. 7) the encrypted privacy-sensitive data PSI and retrieves the privacy-sensitive data SI in clear text. The visited mobile network SEE entity VMME has been provisioned for this purpose (in the initialization stage or after) with the necessary private secret decryption key VPSK (that is different from the home network private secret decryption key HPSK).

The visited mobile network SEE entity VMME retrieves the privacy-sensitive data SI in clear text and, based thereon, correctly identifies the user's home mobile network HMN. The visited mobile network SEE entity VMME has to forward the privacy-sensitive data SI to the home mobile network HMN, in order to, for example, retrieve the user authentication data (indeed, the authentication data is computed by the home mobile network). Therefore, the visited mobile network SEE entity VMME retrieves the home network context information HCI of the home mobile network HMN and, prior to forwarding, encrypts (reference EALG in FIG. 7) the privacy-sensitive information SI with the home mobile network context information HCI and the public key PubK; the visited mobile network SEE entity VMME also signs (reference SALG in FIG. 7) the message to be sent with its own visited mobile network private secret encryption key VPSK and with the visited mobile network context information VCI, in order to guarantee the authentication of the sender.

Advantageously, in this way privacy-sensitive data are protected also during roaming.

The SEE entity in the home mobile network HMN that receives the message with the encrypted and signed privacy-sensitive data PSI from the visited mobile network VMN is able to decrypt (reference DALG in FIG. 7) the received message using the home mobile network private secret key HPSK and to verify (reference VALG in FIG. 7) the signature with the public key PubK and the visited mobile network context information VCI.

Such SEE entity in the home mobile network HMN can be the home network authentication entity HAE or a Diameter Edge Agent DEA generally used in a roaming scenario as a first entry point to the home mobile network HMN. This choice depends on the network architecture and specific configurations.

In cases where the Diameter Edge Agent DEA is the SEE entity, the Diameter Edge Agent DEA should be provisioned with the home mobile network private secret key HPSK to be able to decrypt and retrieve in clear text the encrypted privacy-sensitive information PSI and to forward then the authentication request to the home network authentication entity HAE. The public key PubK should be available to all elements, therefore the Diameter Edge Agent DEA should be able to verify the signature as well.

In response to the authentication request, the home mobile network authentication entity HAE of the home network HMN verifies the user's identifying information contained in the privacy-sensitive data SI and computes the authentication data that needs to be sent back to the SEE entity VMME of the visited mobile network VMN. Therefore, the home mobile network authentication entity HAE retrieves the visited mobile network context information VCI of the visited mobile network VMN and, prior to forwarding the authentication data, encrypts (reference EALG in FIG. 7) the privacy-sensitive information (which now contains the authentication data) with the visited mobile network context information VCI and the public key PubK. The home mobile network authentication entity HAE may also digitally sign (reference SALG in FIG. 7) the message to be sent with its own home mobile network private secret key HPSK and with the home mobile network context information HCI, in order to guarantee to the visited mobile network VMN the authenticity of the sender of the privacy-sensitive information SI. Subsequently, the new protected privacy-sensitive information PSI is sent to the visited mobile network VMN.

The SEE entity VMME in the visited mobile network VMN that receives the message with the encrypted and signed privacy-sensitive data PSI is able to decrypt it (reference DALG in FIG. 7) using the visited mobile network private secret key VPSK and to verify (reference VALG in FIG. 7) the signature with the public key PubK and the home mobile network context information HCI.

The scheme just described can be used whenever a visited mobile network VMN and a home mobile network HMN exchange privacy-sensitive information SI, that can be and is not limited to: the user identifying information (such as the subscriber's identifier present in Attach Requests and Identity Responses), the authentication data (Authentication Information Request—AIR—and related answer Authentication Information Answer—AIA—related to the Diameter signaling protocol), the location information (Update Location Request—ULR and the related answer Update Location Answer—ULA related to the Diameter protocol), etc.

An advantage of the described embodiments of the solution here disclosed is the use of local context privacy support information broadcasted over the communication channel, which allow a mobile device to dynamically authorize the decryption of the privacy-sensitive data to authorized network entities only, depending on the wireless network to which the mobile device is connected.

Another advantage of the described embodiments of the solution here disclosed is the limited amount of cryptographic material that has to be distributed to the mobile devices (only one public encryption key PubK), and therefore that has to be managed on device.

The solution disclosed herein provides the home mobile network HMN with a home mobile network private secret key HPSK (used for decryption and signing) that, depending on the network configuration and architecture, can be stored in any entity of the home mobile network having the role of an SEE entity: such an SEE entity can for example be the home mobile network mobility management entity HMME, the home mobile network authentication entity HAE or the Diameter Edge Entity DEA. The home mobile network private secret key HPSK is the same in all the SEE entities in the home mobile network HMN.

The home mobile network private secret key HPSK is bound to the home mobile network context information HCI and allows the decryption of privacy-sensitive data for all the home mobile network users, as well as the signing (and therefore authentication) of privacy-sensitive data generated for all users.

Any visited mobile network VMN, i.e. any mobile network that has a roaming agreement with the home mobile network HMN, is provisioned with its own private secret key (the visited network private secret key VPSK in the embodiment described above) to decrypt the encrypted privacy-sensitive data PSI of all its served users, including the served users belonging to (i.e., subscriber of) another home mobile network HMN which are in roaming and have to use the correct visited mobile network context information VCI. The visited mobile network private secret key VPSK can be stored in any visited mobile network mobility management entity VMME that plays the role of SEE entity in the visited mobile network.

Figure 8:
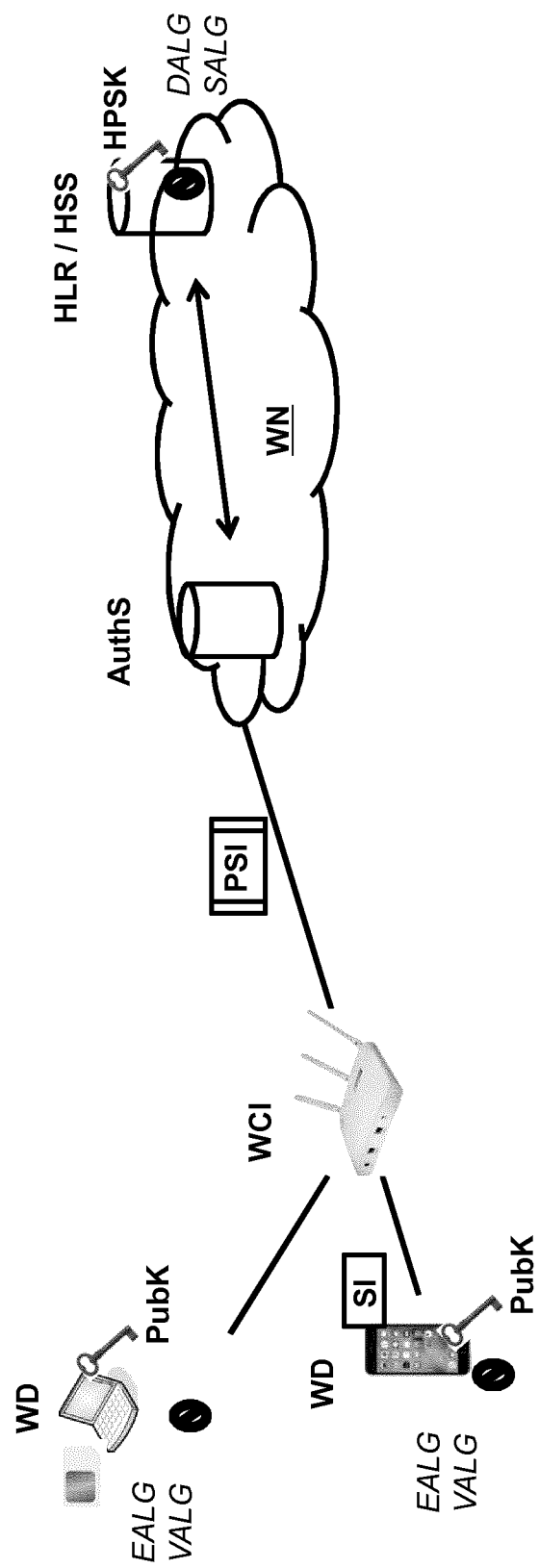
FIG. 8 shows still another embodiment of the solution disclosed herein, for a Wi-Fi network where users employ the EAP-SIM or EAP-AKA or EAP-AKA' authentication procedures.

FIG. 8 depicts an embodiment of the solution disclosed herein applied to a Wi-Fi scenario in which any authentication method based on the exchange of privacy-sensitive identifying information in clear text is usually implemented (e.g., like when using EAP-SIM—defined in IETF RFC 4186-, EAP-AKA—defined in IETF RFC 4187-or EAP-AKA'—defined in IETF RFC 5448-authentication protocols).

A wireless user device WD is connected to a (privacy-aware) Wi-Fi network WN via a wireless connection (like for example the ones specified by the IEEE 802.11 wireless LAN standards). The wireless user device WD supports 3GPP access capabilities, i.e. it is provided with a USIM and the credentials in the device's USIM card are used for the authentication procedure.

The Wi-Fi network WN has been provisioned (e.g. in the initialization stage) and is broadcasting the privacy support context information WCI (i.e., the current network privacy attribute); for example, the context information WCI is broadcasted by the access points of the Wi-Fi network WN. One of the supported user authentication protocols (e.g., EAP-SIM, EAP-AKA, EAP-AKA') is based on an initial exchange of privacy-sensitive user identifying information SI in clear text.

The wireless devices WD are EE entities: they have available (have been provisioned with) the public key PubK and receive from the access points the current context information WCI. The public key PubK of the cryptosystem is provisioned to wireless devices WD of all users which are subscribers of the Wi-Fi network WN at subscription time or using a secure OTA procedure.

The SEE entities of the Wi-Fi network WN are provisioned with the current corresponding private secret key HPSK (for decryption and digital signing), since the SEE entities are authorized to decrypt privacy-sensitive data SI of their home (subscriber) users and also to sign SI records.

The public key PubK will be used by all the wireless devices WD (all EE entities) to encrypt (reference EALG in FIG. 8) privacy-sensitive data SI by using the the current context information WCI of the Wi-Fi network WN.

Therefore, the wireless device WD shown in FIG. 8 is connected to the Wi-Fi network WN and has received, during the wireless access procedure, the context information WCI in order to be able to perform encryption and therefore to protect the privacy-sensitive data SI (which, otherwise, would be sent in clear text on the wireless connection, since the legacy authentication procedure has not been performed/completed yet).

An additional authentication server 3GPP AAA server AuthS can also be present in the Wi-Fi network WN, but typically this might not be required to have the role of SEE entity, since it should be sufficient for this network element to forward the encrypted privacy-sensitive information SI to the configured SEE entity. To route the encrypted privacy-sensitive information SI, the authentication server AuthS uses the realm, a fully qualified domain name that identifies the home Wi-Fi Network. The realm is indicated in the user identity in the format known as NAI that is "username@realm". The Username can be the IMSI or a temporary pseudonym and the 'realm' will be a fully qualified domain name that identifies the home Wi-Fi Network. The usage and format of NAIs for 3GPP WLAN Interworking have been defined in the 3GPP TS23.003. For this reason the wireless device WD only encrypts the username part of the NAI.

The authorized SEE entity of the Wi-Fi network WN is an element of the home mobile network HMN of the user, i.e. the mobile network to which the user has subscribed and received its subscriber ID and SIM (Subscriber Identity Module). Typically, the authorized SEE entity is an HLR (Home Location Register) or an HSS (Home Subscriber Server). The SEE entity receives the protected (encrypted) privacy-sensitive data PSI and, by using the home mobile network private secret key HPSK and the associated context information WCI, performs a decryption (reference DALG in FIG. 8) to retrieve the sensitive information SI in clear text. In this way the home mobile network HMN is able to identify the user and to perform authentication (e.g., to complete the AKA procedure). The location of the SEE might vary from one network architecture to another.

The digital signature function (reference SALG in FIG. 8) is always located on the SEE entity which produces the privacy-sensitive SI data related to a user. For example, for sending the authentication data (e.g., the user's authentication vectors in AKA), the issuing entity HLR or HSS can sign them before transmission to the authentication server AuthS of the Wi-Fi network WN. If such information is also encrypted the authentication server AuthS shall have the home mobile network private secret key HPSK. The encryption (reference EALG in FIG. 8) is performed with the public key PubK, while the digital signature procedure employs the home mobile network private secret key HPSK. In this scenario the encryption function is available on all the network elements involved in the scheme.

The protection of privacy-sensitive data is guaranteed in roaming scenarios as well, based on appropriate context information together with the authentication of all network entities involved in the handling/processing of the privacy-sensitive data.

The solution disclosed in this document provides protection of any privacy-sensitive data or information SI exchanged in wireless networks (like Wi-Fi networks and mobile networks, including future 5G mobile networks) by dynamically enabling an encryption and digital signing function, and a decryption and digital signature verification function, only on specifically authorized network entities/elements that can dynamically change based on the user mobility; such dynamics is made possible by exploiting public Context Information exchanged in the wireless networks.

According to the solution disclosed herein, an owner of privacy-sensitive data controls and has the guarantee of the protection of her/his privacy-sensitive data, by allowing only the authorized network entities to access the privacy-sensitive data. The protection of the privacy-sensitive data is preserved while such data propagates through the wireless network to its final destination (i.e. to the recipient network entity authorized to handle the privacy-sensitive data).

The private secret keys are deployed only on the authorized network entities which have to perform signature and decryption operations, while all end users are entitled to perform targeted public key-based encryption operations in order to protect any privacy-sensitive data they send to the wireless network and to select the authorized network entities able to decrypt and handle the privacy-sensitive data that the end users send.

According to the solution disclosed herein, based on appropriate context information the protection of privacy-sensitive data is guaranteed in roaming scenarios as well, together with the authentication of all network entities involved in the handling/processing of the privacy-sensitive data.

A remarkable advantage of the solution disclosed herein is that it does not heavily involve the end user devices in key management procedures, and can provide for smooth private secret key revocation, such that all the communicating entities always use the currently active public and private secret keys and not some revoked obsolete or even compromised keys. The key revocation is smooth in the sense that it does not disrupt either the communication or the protection services.

Another advantage of the solution disclosed herein is that the broadcast of fake context information, such as fake network and key identifiers, does not compromise the protection of exchanged privacy-sensitive data, because the decryption of encrypted privacy-sensitive data by an unauthorized entity is not allowed, for at least two reasons. First, such a fake entity is not provisioned with the corresponding decryption private secret key, and second, the EE entity owning the privacy-sensitive data cannot encrypt it by using a fake identifier/attribute information: the encryption process would fail because the fake context information is not originally present in the CI universe U.

Moreover, a fake network (entity) cannot sign the messages carrying the privacy-sensitive data as an authorized network (entity) would do, even if the fake network (entity) knows the associated context information, unless of course the private secret key of an authorized SEE entity has been compromised.

A fake entity can broadcast fake context information referring to, for example, a compromised past private secret key that has been revoked and is no longer used in the system. Therefore, all EE entities should have means to control if the broadcasted context information is valid or not at any given moment in time. The revocation procedure described in the foregoing meets this requirement: a revoked context information (or a list of revoked context information) is sent in a secure way to all EE entities that are correctly authenticated. Such information is sent signed with the private secret key of the current serving wireless network so that it can be authenticated (the digital signature correctly verified) by the EE entities.

Additionally, if the context information is not broadcasted by a network entity (like the visited network or the Wi-Fi network when the device is performing the attach procedure) the user device will not perform the network's attach procedure but it will look for an alternative wireless network, if available, which guarantees the privacy of the privacy-sensitive identification data.

The invention claimed is:

1. A method of protecting the exchange of privacy-sensitive data in a wireless communication network, the method comprising:
   generating and providing a public cryptographic key to a first entity that possesses privacy-sensitive data to be sent to a wireless communication network through a wireless connection;
   generating and providing a private secret cryptographic key to a second entity that is an intended intermediate or final recipient of the privacy-sensitive data, wherein
   the private secret cryptographic key is bound to the public cryptographic key,
   the private secret cryptographic key is associated to privacy support context information to identify the wireless communication network,
   the privacy support context information includes an identifier of the wireless communication network logically combined with information to identify the private secret cryptographic key using at least one of a logic AND operator, a logic OR operator, or a logic NOT operator,
   the information to identify the private secret cryptographic key includes a key index,
   said identifier of the wireless communication network included in said privacy support context information comprises one of a wireless communication network identifier and a Public Land Mobile Network Identifier, and
   the private secret cryptographic key is generated by a key generation procedure whose input is at least the entirety of the privacy support context information that includes the identifier of the wireless communication network logically combined with the information to identify the private secret cryptographic key using the at least one of the logic AND operator, the logic OR operator, or the logic NOT operator;
   having the wireless communication network send, to the first entity, the privacy support context information via broadcast through a signaling message or via a beacon signal;
   having the first entity receive the wireless network privacy support context information sent by the wireless communication network and encrypt the privacy-sensitive data using the public cryptographic key and the received wireless network privacy support context information to obtain protected, encrypted privacy-sensitive data;
   after the private secret cryptographic key is provided to second entity, having the first entity send, to the second entity through the wireless communication network, the encrypted privacy-sensitive data; and
   having the second entity decrypt the encrypted privacy-sensitive data exploiting the private secret cryptographic key which the second entity received prior to receiving the encrypted privacy-sensitive data, wherein
   the privacy support context information is included in a dedicated field of a message type of the signaling message sent through the broadcast or the beacon signal.

2. The method according to claim 1, wherein said privacy support context information comprises a combination of said wireless communication network identifier and a function indication configured to identify a function of the second entity.

3. The method according to claim 1, wherein said privacy support context information comprises a combination of two or more identifiers of wireless communication networks.

4. The method according to claim 1, wherein said identifier of the wireless communication network included in said privacy support context information comprises identifying information configured to identify a currently active private secret cryptographic key of the wireless communication network from among a plurality of private secret cryptographic keys.

5. The method according to claim 1, wherein said privacy support context information is transmitted using one among: at least one Radio Resource Control message and at least one Beacon message.

6. The method according to claim 1, wherein said privacy support context information is sent to the first entity contextually to, or as part of, a selection procedure of the wireless communication network, performed by the first entity, by a wireless network entity providing the wireless connection to the wireless communication network, particularly contextually to, or as part of, a Wi-Fi network discovery procedure or a mobile device synchronization procedure.

7. The method according to claim 1, wherein said public cryptographic key is provisioned to the first entity upon subscription of the first entity to the wireless communication network or subsequently over the air.

8. The method according to claim 1, wherein
the wireless communication network comprises a first wireless communication network and a second wireless communication network, each comprising respective second entities, which have been provided with first and second private secret cryptographic keys respectively bound to the public cryptographic key and associated to respective first and second privacy support context information,
the first entity is connected to the first wireless network and has to send privacy- sensitive data to one of the second entities of the second wireless network as final recipient, and
the method further comprises:
having the first wireless communication network and the second wireless communication network communicate to each other the respective first and second privacy support context information;
at the first entity, receiving the first privacy support context information sent by the first wireless communication network and encrypting the privacy-sensitive data using the public cryptographic key and the first privacy support context information of the first wireless network to obtain first protected, encrypted privacy-sensitive data;
having the first entity send the encrypted privacy-sensitive data to one of the second entities of the first wireless network as intermediate recipient;
having the second entity of the first wireless network decrypt the encrypted privacy-sensitive data exploiting the first private secret cryptographic key to retrieve the privacy-sensitive data;
having the second entity of the first wireless network retrieve the second privacy support context information of the second wireless network by looking at the retrieved privacy- sensitive data;
having the second entity of the first wireless network encrypt the privacy- sensitive data exploiting the public cryptographic key and the second privacy support context information of the second wireless network to obtain second protected, encrypted privacy- sensitive data;
having the second entity of the first wireless network send the second protected, encrypted privacy-sensitive data to one of the second entities of the second wireless network as final recipient; and
having the second entity of the second wireless network decrypt the received second protected, encrypted privacy-sensitive data exploiting the second private secret cryptographic keys.

9. The method according to claim 8, further comprising:
having the second entity of the first wireless network apply a digital signature to the second protected, encrypted privacy-sensitive data exploiting the first private secret cryptographic key and the first privacy support context information of the first wireless network before sending the second protected, encrypted privacy-sensitive data to the second entity of the second wireless network; and
having the second entity of the second wireless network verify the digital signature applied by the second network entity of the first wireless network, by exploiting the public cryptographic key and the first privacy support context information of the first wireless network.

10. The method according to claim 9, wherein said privacy-sensitive data comprise identifying information for authenticating the first entity in said wireless communication network.

11. The method according to claim 10, further comprising:
having the second entity of the second wireless network verify the identifying information of the first entity and computing authentication data for the authentication of the first network entity;
having the second entity of the second wireless network encrypt said authentication data for the authentication of the first entity using the public cryptographic key and the first privacy support context information of the first wireless network, to obtain protected, encrypted authentication data for the authentication of the first entity;
having the second entity of the second wireless network send the protected, encrypted authentication data to the second entity of the first wireless network;
having the second entity of the first wireless network decrypt the protected, encrypted authentication data using the first private secret cryptographic key to retrieve the authentication data; and
having the second entity of the first wireless network authenticate the first network entity.

12. The method according to claim 11, further comprising:
having the second entity of the second wireless network apply a digital signature to the protected, encrypted authentication data using the second private secret cryptographic key and the second privacy support context information of the second wireless network before sending to the second entity of the first wireless network; and
having the second entity of the first wireless network verify the digital signature applied by the second entity of the second wireless network, by using the public cryptographic key and the second privacy support context information of the second wireless network.

13. The method according to claim 9, wherein said digital signature is applied by using an attribute-based encryption and signature cryptosystem.

14. The method according to claim 1,
wherein said generating and providing a private secret cryptographic key comprises generating and providing to said second entity at least two private secret cryptographic keys, and
wherein the privacy support context information suitable to identify the wireless communication network comprises an indication of a currently used private secret cryptographic key among the at least two private secret cryptographic keys.

15. The method according to claim 14, further comprising revoking one of the at least two private secret cryptographic keys.

16. A system for protecting the exchange of privacy-sensitive data in a wireless communication network, the system comprising:
a wireless communication network configured to provide wireless connectivity to a first entity possessing privacy-sensitive data to be sent to the wireless communication network through a wireless connection;

an encryption function in the first entity configured to encrypt the privacy-sensitive data to be sent using a public cryptographic key and wireless network privacy support context information received from the wireless communication network via broadcast through a signaling message or via a beacon signal, to obtain protected, encrypted privacy-sensitive data, wherein the wireless network privacy support context information are suitable to identify the wireless communication network;

a second entity in the wireless communication network being the intended intermediate or final recipient the privacy-sensitive data; and a decryption function in the second entity configured to decrypt the encrypted privacy-sensitive data received from the first entity using a private secret cryptographic key bound to the public cryptographic key and associated to the privacy support context information suitable to identify the wireless communication network, the private secret cryptographic key having been received by the second entity before the encrypted privacy-sensitive data is received from the first entity, wherein the privacy support context information includes an identifier of the wireless communication network logically combined with information to identify the private secret cryptographic key using at least one of a logic AND operator, a logic OR operator, or a logic NOT operator, the information to identify the private secret cryptographic key includes a key index, the privacy support context information is included in a dedicated field of a message type of the signaling message sent through the broadcast or the beacon signal, said identifier of the wireless communication network included in said privacy support context information comprises one among: a wireless communication network identifier and a Public Land Mobile Network Identifier, and the private secret cryptographic key is generated by a key generation procedure whose input is at least the entirety of the privacy support context information that includes the identifier of the wireless communication network logically combined with the information to identify the private secret cryptographic key using the at least one of the logic AND operator, the logic OR operator, or the logic NOT operator.

* * * * *